US011996037B2

(12) United States Patent
Hsieh et al.

(10) Patent No.: US 11,996,037 B2
(45) **Date of Patent: *May 28, 2024**

(54) SCAN-TYPE DISPLAY APPARATUS CAPABLE OF SHORT CIRCUIT DETECTION, AND DATA DRIVER THEREOF

(71) Applicant: MACROBLOCK, INC., Hsinchu (TW)

(72) Inventors: Chi-Min Hsieh, Hsinchu (TW); Che-Wei Chang, Hsinchu (TW); Chen-Yuan Kuo, Hsinchu (TW); Wei-Hsiang Cheng, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,852

(22) Filed: Dec. 5, 2022

(65) Prior Publication Data

US 2023/0196988 A1 Jun. 22, 2023

(30) Foreign Application Priority Data

Dec. 17, 2021 (TW) ................................ 110147451

(51) Int. Cl.
*G09G 3/32* (2016.01)

(52) U.S. Cl.
CPC ....... *G09G 3/32* (2013.01); *G09G 2310/0267* (2013.01); *G09G 2310/0272* (2013.01); *G09G 2310/0278* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 11,875,737 B2 * | 1/2024 | Hsieh | ..................... | G09G 3/006 |
| 2005/0110719 A1 * | 5/2005 | Satoh | .................. | G09G 3/3275 345/76 |
| 2011/0279128 A1 * | 11/2011 | Von Staudt | ............ | G09G 3/006 324/538 |
| 2022/0262300 A1 * | 8/2022 | Hung | .................. | G09G 3/2007 |
| 2023/0196989 A1 * | 6/2023 | Hsieh | ....................... | G09G 3/32 345/82 |

FOREIGN PATENT DOCUMENTS

| | | |
|---|---|---|
| TW | 201926299 A | 7/2019 |
| TW | 202137193 A | 10/2021 |
| TW | 202137196 A | 10/2021 |

* cited by examiner

*Primary Examiner* — Ifedayo B Iluyomade
(74) *Attorney, Agent, or Firm* — Akerman LLP; Peter A. Chiabotti

(57) ABSTRACT

A scan-type display apparatus includes an LED array and a data driver. The LED array has a common anode configuration, and includes multiple scan lines, multiple data lines and multiple LEDs. The data driver includes multiple data driving circuits, each of which includes a current driver and a detector. The current driver has an output terminal connected to the data line corresponding to the data driving circuit, and outputs one of a drive current and a clamp voltage at the output terminal of the current driver based on a pulse width control signal. The detector is connected to the current driver, and generates a detection signal that indicates whether any one of the LEDs connected to the data line corresponding to the data driving circuit is short circuited based on a detection timing signal and a feed-in voltage related to a voltage at the output terminal of the current driver.

21 Claims, 17 Drawing Sheets

SCAN-TYPE DISPLAY APPARATUS CAPABLE OF SHORT CIRCUIT DETECTION, AND DATA DRIVER THEREOF

CROSS-REFERENCE TO RELATED APPLICATION

This application claims priority to Taiwanese Patent Application No. 110147451, filed on Dec. 17, 2021.

FIELD

The disclosure relates to display technology, and more particularly to a scan-type display apparatus capable of short circuit detection and a data driver thereof.

BACKGROUND

Although conventional methods for driving a light emitting diode (LED) display to emit light in a line scan manner may alleviate ghosting phenomenon and cross-channel coupling problems of the LED display, it may cause other problems such as short circuit caterpillar phenomenon. For each LED of the LED display, charges released by parasitic capacitance across the LED may flow through the LED, so as to cause the LED to emit light. This unexpected light emission of the LED is the so called ghosting phenomenon. For each line of the line scan of an LED array of the LED display, a dark pixel of the line may be affected by a bright pixel of the line to produce a brightness different from what would be expected. This is the so called cross-channel coupling problem. The short circuit caterpillar phenomenon includes the always bright caterpillar phenomenon and the always dark caterpillar phenomenon. A short circuit of an LED in the LED array of the LED display may cause that LED and other LEDs in the same column of the LED array to be always bright. This is the so called always bright caterpillar phenomenon. Similarly, a short circuit of an LED in the LED array of the LED display may cause that LED and other LEDs in the same column of the LED array to be always dark. This is the so called always dark caterpillar phenomenon. Therefore, the short circuit caterpillar phenomenon degrades the display quality of the LED display.

SUMMARY

Therefore, an object of the disclosure is to provide a scan-type display apparatus capable of short circuit detection and a data driver thereof. The scan-type display apparatus can alleviate the drawback of the prior art.

According to an aspect of the disclosure, the scan-type display apparatus includes a light emitting diode (LED) array and a data driver. The LED array has a common anode configuration, and includes a plurality of scan lines, a plurality of data lines and a plurality of LEDs. The LEDs are arranged in a matrix that has a plurality of rows respectively corresponding to the scan lines and a plurality of columns respectively corresponding to the data lines. With respect to each of the rows, anodes of the LEDs in the row are connected to the scan line that corresponds to the row. With respect to each of the columns, cathodes of the LEDs in the column are connected to the data line that corresponds to the column. The data driver includes a plurality of data driving circuits that respectively correspond to the data lines. Each of the data driving circuits includes a current driver and a detector. The current driver has an output terminal that is connected to the data line corresponding to the data driving circuit, receives a pulse width control signal, and outputs one of a drive current and a clamp voltage at the output terminal of the current driver based on the pulse width control signal. The detector is connected to the current driver to receive a feed-in voltage related to a voltage at the output terminal of the current driver, further receives a detection timing signal, and generates a detection signal that indicates whether any one of the LEDs connected to the data line corresponding to the data driving circuit is short circuited based on the feed-in voltage and the detection timing signal.

According to another aspect of the disclosure, the data driver is adapted to be used in a scan-type display apparatus that includes a light emitting diode (LED) array. The LED array has a common anode configuration, and includes a plurality of data lines and a plurality of LEDs. Each of the LEDs is connected to a corresponding one of the data lines. The data driver includes a plurality of data driving circuits that respectively correspond to the data lines. Each of the data driving circuits includes a current driver and a detector. The current driver has an output terminal that is connected to the data line corresponding to the data driving circuit, receives a pulse width control signal, and outputs one of a drive current and a clamp voltage at the output terminal of the current driver based on the pulse width control signal. The detector is connected to the current driver to receive a feed-in voltage related to a voltage at the output terminal of the current driver, further receives a detection timing signal, and generates a detection signal that indicates whether any one of the LEDs connected to the data line corresponding to the data driving circuit is short circuited based on the feed-in voltage and the detection timing signal.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
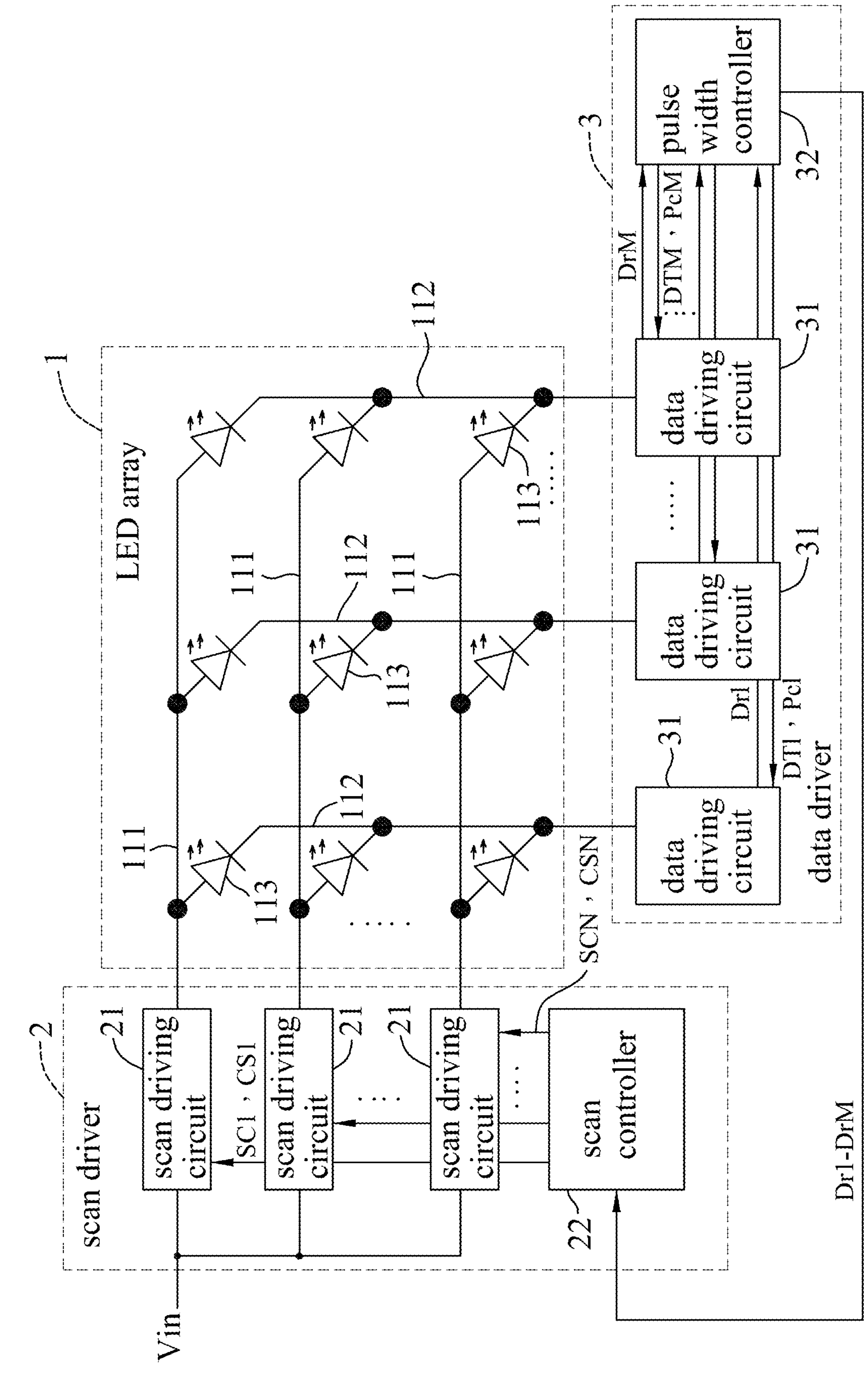
FIG. 1 is a circuit block diagram illustrating a first embodiment of a scan-type display apparatus according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
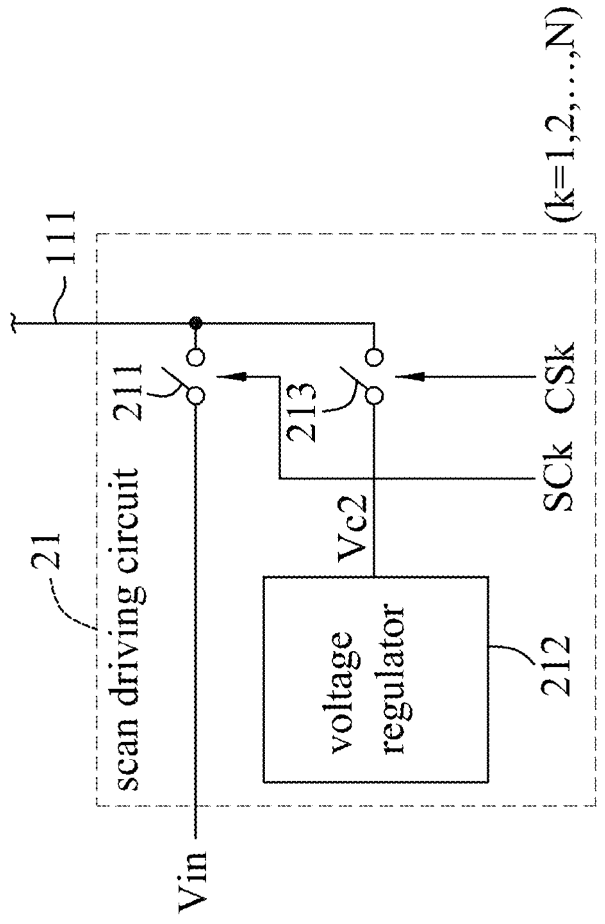
FIG. 2 is a circuit block diagram illustrating a scan driving circuit of the first embodiment.
Figure 3:
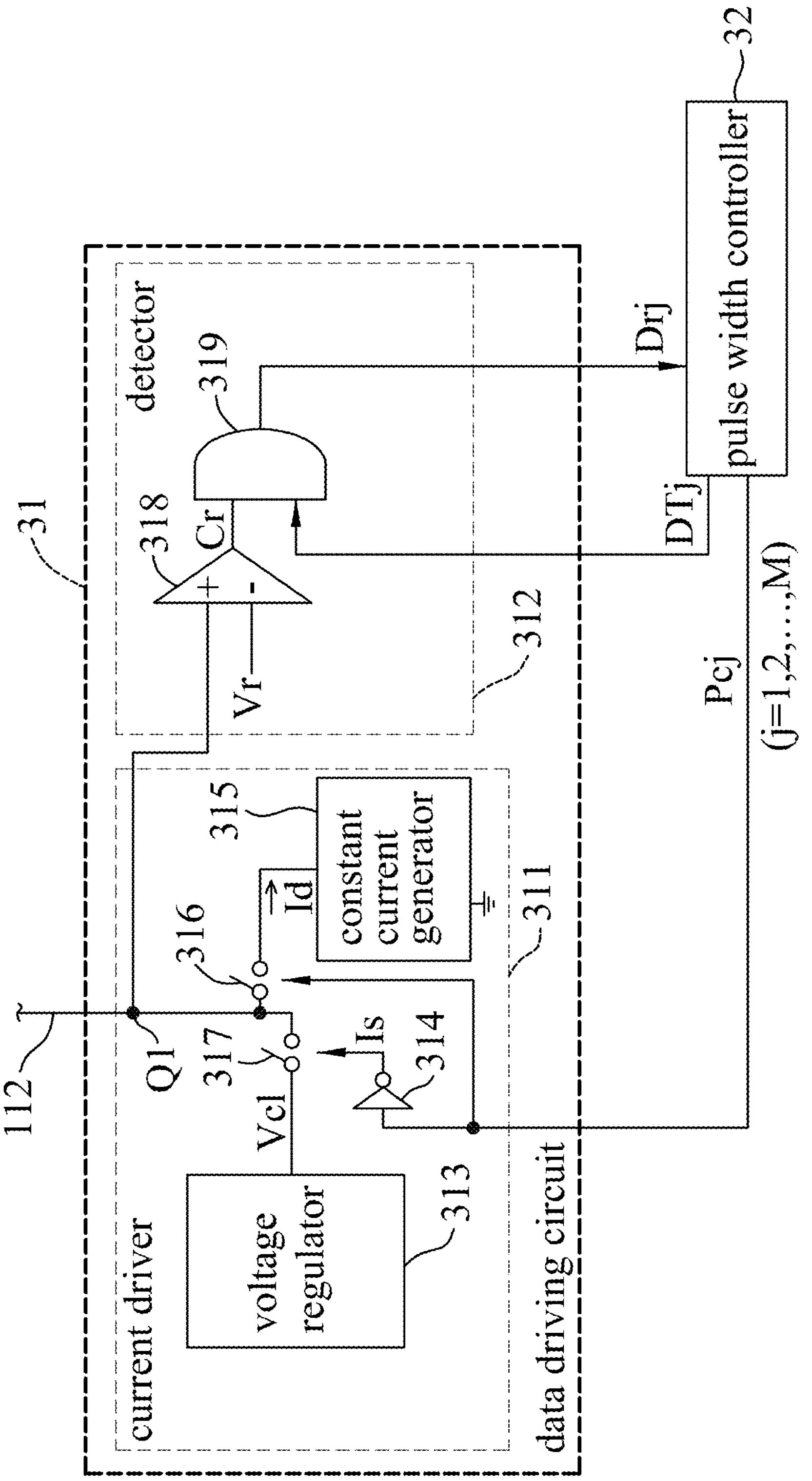
FIG. 3 is a circuit block diagram illustrating a data driving circuit of the first embodiment.

Referring to FIGS. 1, 2 and 3, a first embodiment of a scan-type display apparatus according to the disclosure is capable of short circuit detection, and includes a light emitting diode (LED) array 1, a scan driver 2 and a data driver 3.

The LED array 1 has a common anode configuration, and includes a number (N) of scan lines 111, a number (M) of data lines 112 and a number (N×M) of LEDs 113, where N≥2 and M≥2. The LEDs 113 are arranged in a matrix that has a number (N) of rows respectively corresponding to the scan lines 111 and a number (M) of columns respectively corresponding to the data lines 112. With respect to each of the rows, anodes of the LEDs 113 in the row are connected to the scan line 111 that corresponds to the row. With respect to each of the columns, cathodes of the LEDs 113 in the column are connected to the data line 112 that corresponds to the column. For illustration purposes, in this embodiment, the LEDs 113 in an nth one of the rows is adjacent to the LEDs 113 in an $(n-1)^{th}$ one of the rows, and the LEDs 113 in an $m^{th}$ one of the columns is adjacent to the LEDs 113 in an $(m-1)^{th}$ one of the columns, where 2≤n≤N and 2≤m≤M.

The scan driver 2 includes a number (N) of scan driving circuits 21 and a scan controller 22. The scan driving circuits 21 respectively correspond to the scan lines 111.

The scan controller 22 receives a number (M) of detection signals (Dr1-DrM), and generates a number (N) of scan signals (SC1-SCN) that respectively correspond to the scan driving circuits 21 and a number (N) of clamp signals (CS1-CSN) that respectively correspond to the scan driving circuits 21, with the clamp signals (CS1-CSN) dependent on the detection signals (Dr1-DrM).

Each of the scan driving circuits 21 is connected to the corresponding scan line 111, and is further connected to the scan controller 22 to receive the corresponding scan signal (SCk) and the corresponding clamp signal (CSk), and further receives an input voltage (Vin), where 1≤k≤N. Each of the scan driving circuits 21 is operable to output or not output the input voltage (Vin) to the corresponding scan line 111 based on the corresponding scan signal (SCk), and is operable to output or not output a clamp voltage (Vc2) to the corresponding scan line 111 based on the corresponding clamp signal (CSk). The clamp voltage (Vc2) is used to eliminate ghosting phenomenon and cross-channel coupling problems of the LED array 1, and is known to those skilled in the art, so details of the clamp voltage (Vc2) are omitted herein for the sake of brevity.

In this embodiment, each of the scan driving circuits 21 includes a scan switch 211, a voltage regulator 212 and a clamp switch 213. The scan switch 211 has a first terminal that receives the input voltage (Vin), a second terminal that is connected to the corresponding scan line 111, and a control terminal that receives the corresponding scan signal (SCk). The scan switch 211 transitions between conduction and non-conduction based on the corresponding scan signal (SCk), and, when conducting, permits transmission of the input voltage (Vin) therethrough to the corresponding scan line 111. The voltage regulator 212 generates the clamp voltage (Vc2). The clamp switch 213 has a first terminal that is connected to the voltage regulator 212 to receive the clamp voltage (Vc2), a second terminal that is connected to the second terminal of the scan switch 211, and a control terminal that receives the corresponding clamp signal (CSk). The clamp switch 213 transitions between conduction and non-conduction based on the corresponding clamp signal (CSk), and, when conducting, permits transmission of the clamp voltage (Vc2) therethrough to the corresponding scan line 111. The scan switch 211 and the clamp switch 213 conduct one at a time.

For illustration purposes, in this embodiment, the second terminal of the scan switch 211 of a $k^{th}$ one of the scan driving circuits 21 is connected to the scan line 111 that is connected to the LEDs 113 in a $k^{th}$ one of the rows; and the scan switch 211 and the clamp switch 213 of the $k^{th}$ one of the scan driving circuits 21 are respectively controlled by the scan signal (SCk) and the clamp signal (CSk), where 1≤k≤N.

The data driver 3 includes a number (M) of data driving circuits 31 and a pulse width controller 32. The data driving circuits 31 respectively correspond to the data lines 112. Each of the data driving circuits 31 includes a current driver 311 and a detector 312.

With respect to each of the data driving circuits 31, the current driver 311 has an output terminal (Q1) that is connected to the corresponding data line 112, receives a pulse width control signal (Pcj), and outputs one of a drive current (Id) and a clamp voltage (Vc1) at the output terminal (Q1) of the current driver 311 based on the pulse width control signal (Pcj), where 1≤j≤M.

In this embodiment, with respect to each of the data driving circuits 31, the current driver 311 includes a voltage regulator 313, an inverter 314, a constant current generator 315, a first switch 316 and a second switch 317. The voltage regulator 313 generates the clamp voltage (Vc1). The inverter 314 receives the pulse width control signal (Pcj), and generates an inverted control signal (Is) that is a logical complement of the pulse width control signal (Pcj) in logic value. The constant current generator 315 generates the drive current (Id). The first switch 316 has a first terminal that is connected to the output terminal (Q1) of the current driver 311, a second terminal that is connected to the constant current generator 315, and a control terminal that receives the pulse width control signal (Pcj). The first switch 316 transitions between conduction and non-conduction based on the pulse width control signal (Pcj), and, when conducting, permits flow of the drive current (Id) therethrough from the output terminal (Q1) of the current driver 311 to the constant current generator 315. The second switch 317 has a first terminal that is connected to the voltage regulator 313, a second terminal that is connected to the output terminal (Q1) of the current driver 311, and a control terminal that is connected to the inverter 314 to receive the inverted control signal (Is). The second switch 317 transitions between conduction and non-conduction based on the inverted control signal (Is), and, when conducting, permits transmission of the clamp voltage (Vc1) therethrough from the voltage regulator 313 to the output terminal (Q1) of the current driver 311.

With respect to each of the data driving circuits 31, the detector 312 is connected to the output terminal (Q1) of the current driver 311, receives a voltage at the output terminal (Q1) of the current driver 311 to serve as a feed-in voltage, further receives a detection timing signal (DTj), and generates a detection signal (Drj) that indicates whether any one of the LEDs 113 connected to the corresponding data line 112 is short circuited based on the feed-in voltage and the detection timing signal (DTj), where 1≤j≤M.

In this embodiment, with respect to each of the data driving circuits 31, the detector 312 includes a comparator 318 and a logic gate 319. The comparator 318 has a first input terminal (e.g., a non-inverting input terminal) that is connected to the output terminal (Q1) of the current driver 311 to receive the feed-in voltage, a second input terminal (e.g., an inverting input terminal) that receives a predetermined reference voltage (Vr), and an output terminal that provides a comparison signal (Cr). The comparison signal (Cr) indicates a result of a comparison between the feed-in voltage and the predetermined reference voltage (Vr). The logic gate 319 (e.g., an AND gate) has a first input terminal that is connected to the output terminal of the comparator 318 to receive the comparison signal (Cr), a second input terminal that receives the detection timing signal (DTj), and an output terminal that provides the detection signal (Drj).

For illustration purposes, in this embodiment, the output terminal (Q1) of the current driver 311 of a $j^{th}$ one of the data driving circuits 31 is connected to the data line 112 that is connected to the LEDs 113 in a $j^{th}$ one of the columns; the first and second switches 316, 317 of the current driver 311 of the $j^{th}$ one of the data driving circuits 31 are controlled by the pulse width control signal (Pcj); and the logic gate 319 of the detector 312 of the $j^{th}$ one of the data driving circuits 31 receives the detection timing signal (DTj) and provides the detection signal (Drj), where $1 \leq j \leq M$.

In this embodiment, the pulse width controller 32 is connected to the scan controller 22, the inverters 314 and the control terminals of the first switches 316 of the current drivers 311 of the data driving circuits 31, and the second input terminals and the output terminals of the logic gates 319 of the detectors 312 of the data driving circuits 31. The pulse width controller 32 generates the pulse width control signals (Pc1-PcM) to be respectively received by the inverters 314 and to be respectively received by the control terminals of the first switches 316, and the detection timing signals (DT1-DTM) to be respectively received by the second input terminals of the logic gates 319. The pulse width controller 32 receives the detection signals (Dr1-DrM) respectively generated by the detectors 312 from the output terminals of the logic gates 319, and outputs the detection signals (Dr1-DrM) respectively received from the detectors 312 for receipt by the scan controller 22.

Figure 4:
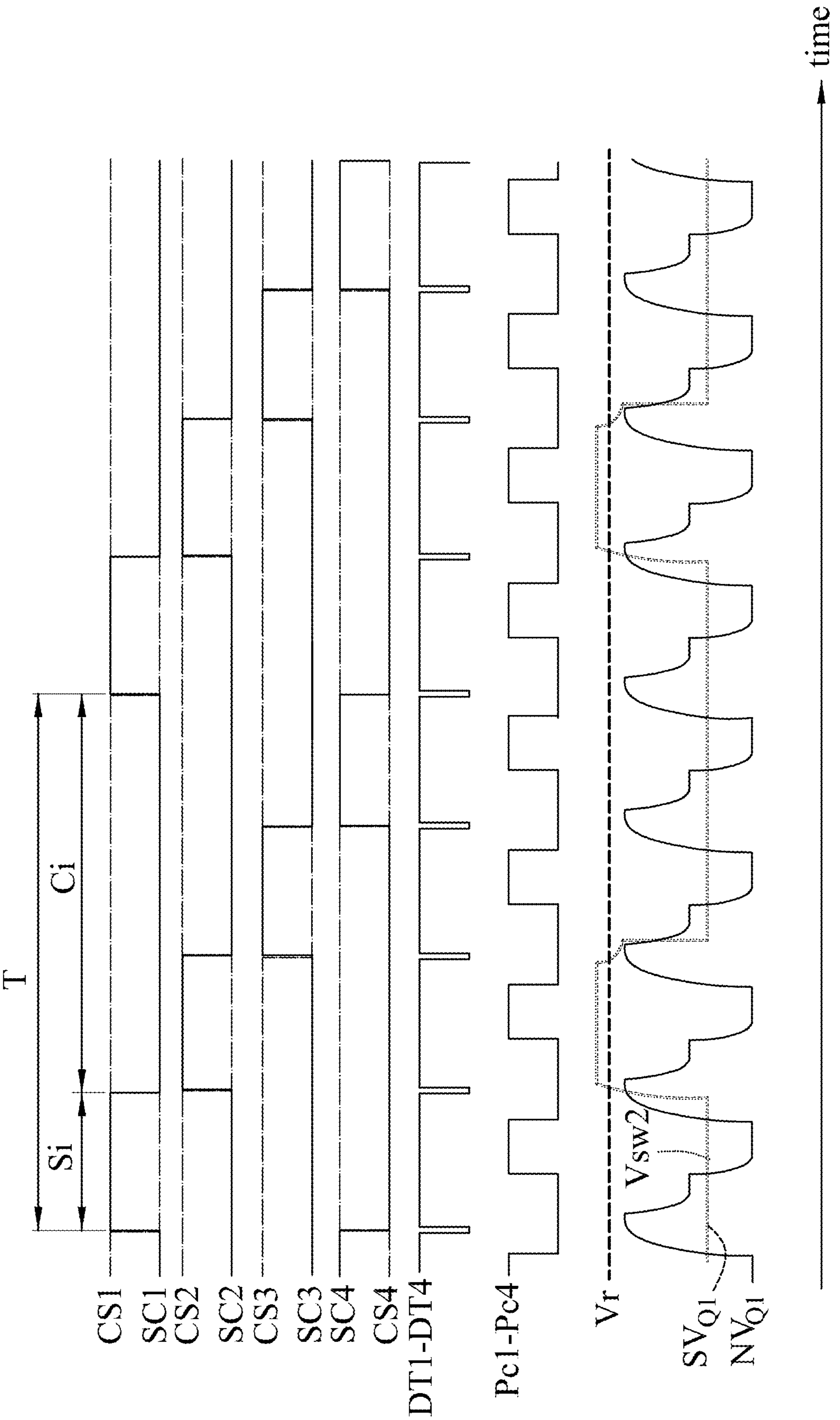
FIGS. 4 to 6 are timing diagrams illustrating operations of the first embodiment.
Figure 5:
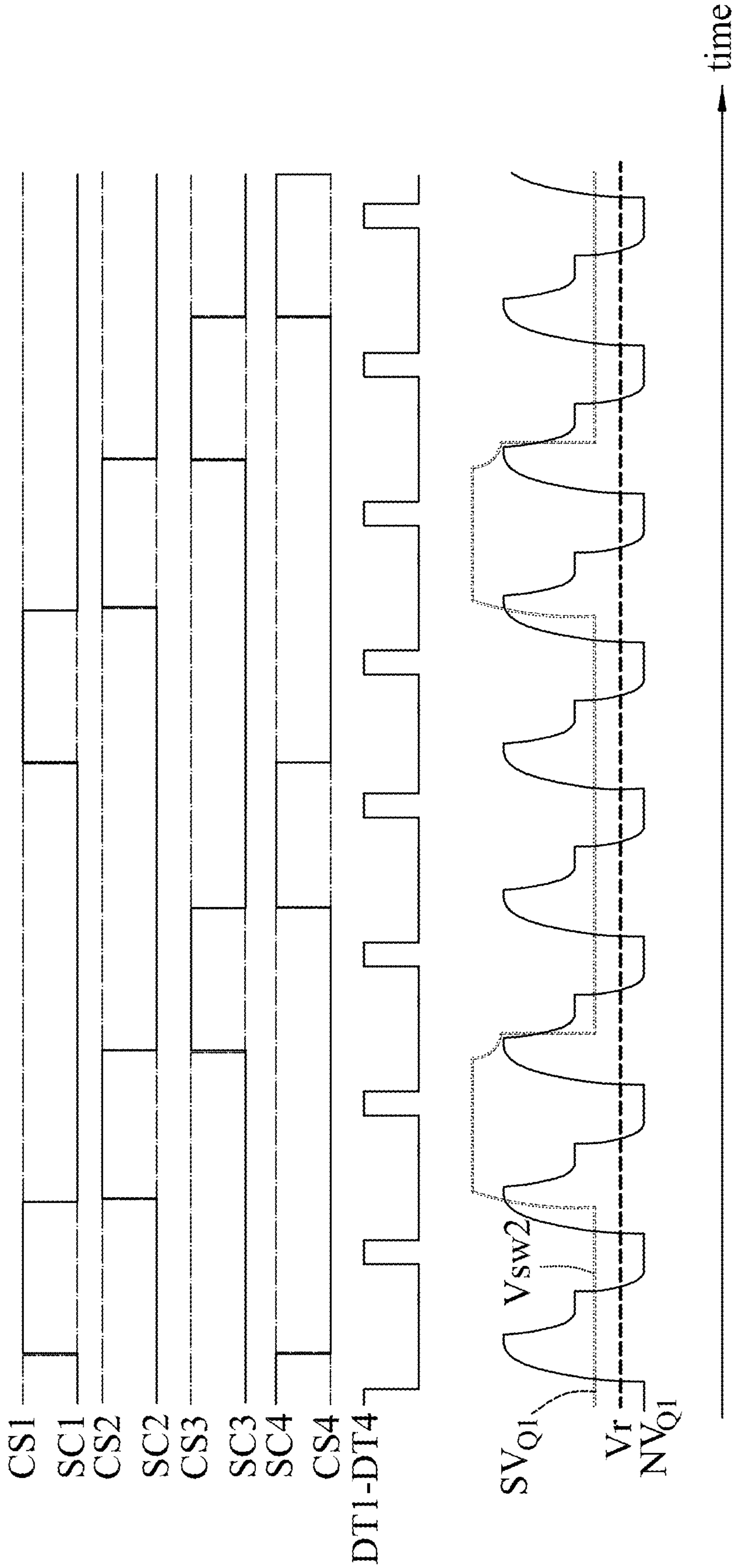
Figure 6:
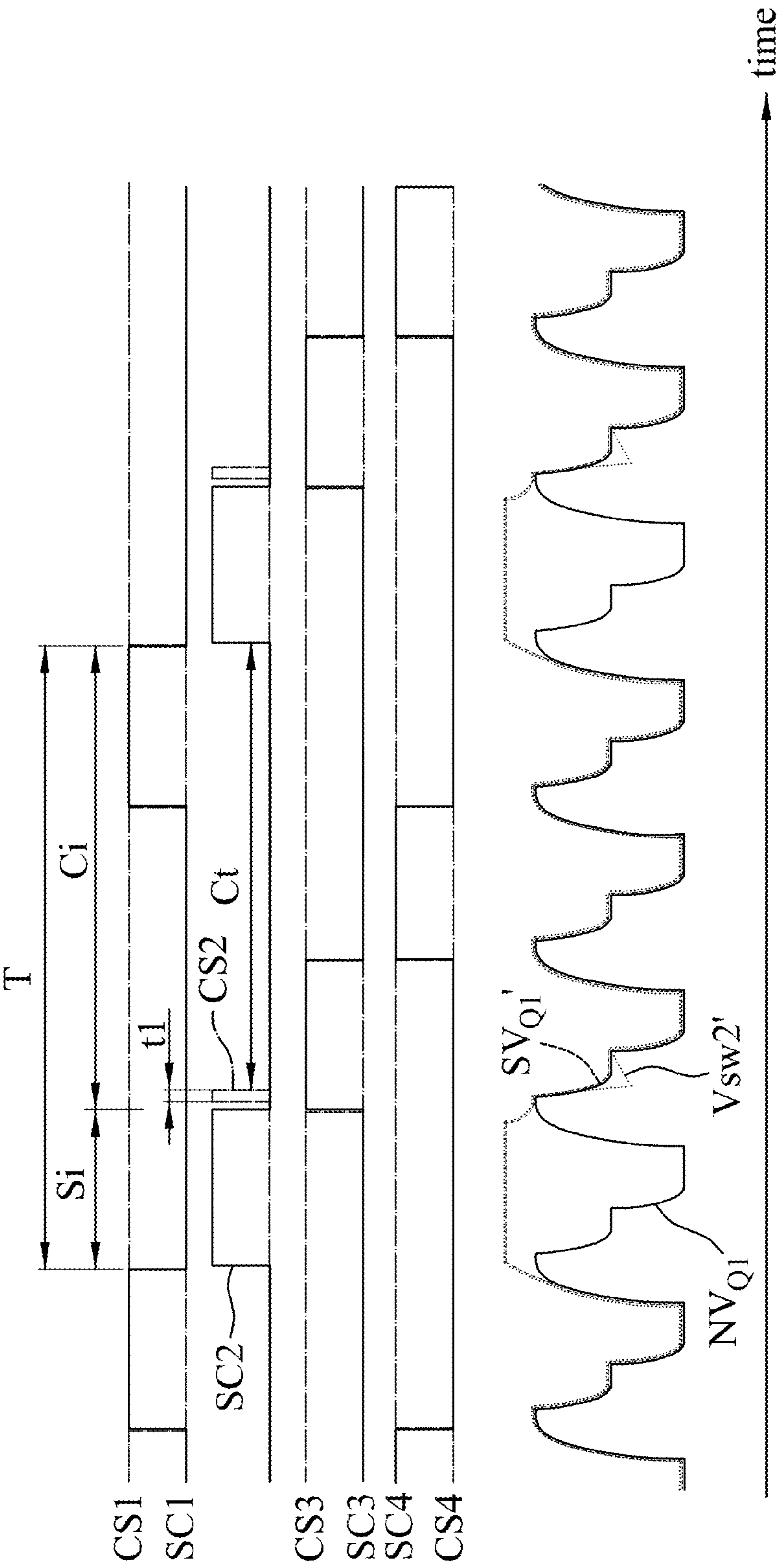

FIGS. 4, 5 and 6 illustrate operations of the scan-type display apparatus of this embodiment in a scenario where the LED array 1 includes four scan lines 111, four data lines 112 and sixteen LEDs 113, the scan driver 2 includes four scan driving circuits 21, and the data driver 3 includes four data driving circuits 31, i.e., M=N=4. Referring to FIGS. 1 to 6, in this embodiment, with respect to each of the scan driving circuits 21, the scan driving circuit 21 has an operation cycle (T) that is repeated and that includes a scan time interval (Si) and a clamp time interval (Ci) coming after/following the scan time interval (Si). The corresponding scan signal (SCk) is at a voltage level (e.g., a logic "1" voltage level) corresponding to conduction of the scan switch 211 during the scan time interval (Si), and is at a voltage level (e.g., a logic "0" voltage level) corresponding to non-conduction of the scan switch 211 during the clamp time interval (Ci). As shown in FIGS. 4 and 5, when the detection signals (Dr1-DrM) cooperatively indicate that none of the LEDs 113 connected to the corresponding scan line 111 is short circuited, the corresponding clamp signal (CSk) is at a voltage level (e.g., a logic "0" voltage level) corresponding to non-conduction of the clamp switch 213 during the scan time interval (Si), and is at a voltage level (e.g., a logic "1" voltage level) corresponding to conduction of the clamp switch 213 during the clamp time interval (Ci). As shown in FIG. 6, when the detection signals (Dr1-DrM) cooperatively indicate that at least one of the LEDs 113 connected to the corresponding scan line 111 is short circuited, the corresponding clamp signal (CSk) is at the voltage level (i.e., the logic "1" level) corresponding to conduction of the clamp switch 213 during a clamp time segment (t1) of the clamp time interval (Ci), and is at the voltage level (i.e., the logic "0" voltage level) corresponding to non-conduction of said clamp switch 213 during other times of the operation cycle (T). The clamp time segment (t1) appears in an initial portion of the clamp time interval (Ci). FIG. 6 depicts an example where the clamp time segment (t1) is spaced apart from the scan time interval (Si) in time, but the disclosure is not limit to such an example. That is, in another example, a starting point of the clamp time segment (t1) may be concurrent with an end point of the scan time interval (Si). Therefore, the scan driving circuit 21 outputs the input voltage (Vin) to the corresponding scan line 111 during the scan time interval (Si), outputs the clamp voltage (Vc2) to the corresponding scan line 111 during the clamp time interval (Ci) when the detection signals (Dr1-DrM) cooperatively indicate that none of the LEDs 113 connected to the corresponding scan line 111 is short circuited, and outputs the clamp voltage (Vc2) to the corresponding scan line 111 during the clamp time segment (t1) when the detection signals (Dr1-DrM) cooperatively indicate that at least one of the LEDs 113 connected to the corresponding scan line 111 is short circuited.

As shown in FIGS. 4 to 6, in this embodiment, a starting point of the scan time interval (Si) of an $n^{th}$ one of the scan driving circuits 21 is concurrent with an end point of the scan time interval (Si) of an $(n-1)^{th}$ one of the scan driving circuits 21, where $2 \leq n \leq N$ (i.e., $2 \leq n \leq 4$ in this embodiment). Therefore, the LED array 1 emits light in a line scan manner.

As shown in FIG. 4, in this embodiment, with respect to each of the data driving circuits 31, the pulse width control signal (Pcj) includes a number (N) of pulses (i.e., four pulses in the embodiment) in a line scan cycle of the LED array 1 that is repeated. The pulses of the pulse width control signal (Pcj) respectively correspond to the scan driving circuits 21. Each of the pulses of the pulse width control signal (Pcj) appears in the scan time interval (Si) of the scan driving circuit 21 corresponding to the pulse, and has a width smaller than a time length of the scan time interval (Si) of the scan driving circuit 21 corresponding to the pulse. Similarly, the detection timing signal (DTj) includes a number (N) of pulses (i.e., four pulses in the embodiment) in the line scan cycle of the LED array 1. The pulses of the detection timing signal (DTj) respectively correspond to the scan driving circuits 21. Each of the pulses of the detection timing signal (DTj) appears in the scan time interval (Si) of the scan driving circuit 21 corresponding to the pulse, and has a width smaller than the time length of the scan time interval (Si) of the scan driving circuit 21 corresponding to the pulse. The pulses of the pulse width control signal (Pcj) and the detection timing signal (DTj) that correspond to the same scan driving circuit 21 overlap in time. The current driver 311 outputs the drive current (Id) to the output terminal (Q1) thereof while within the pulses of the pulse width control signal (Pcj) (e.g., when the pulse width control signal (Pcj) is at a logic "1" voltage level), and outputs the clamp voltage (Vc1) to the output terminal (Q1) thereof while outside the pulses of the pulse width control signal (Pcj) (e.g., when the pulse width control signal (Pcj) is at a logic "0" voltage level). The detector 312 detects whether any one of the LEDs 113 connected to the corresponding data line 112 is short circuited while within the pulses of the detection timing signal (DTj) (e.g., when the detection timing signal (DTj) is at a logic "1" voltage level), and does not perform detection while outside the pulses of the detection timing signal (DTj) (e.g., when the detection timing signal (DTj) is at a logic "0" voltage level). FIG. 4 depicts an example where the pulse width control signals (Pc1-PcM) (i.e., Pc1-Pc4 in this embodiment) have the same waveform, the pulses of the pulse width control signals (Pc1-PcM) (i.e., Pc1-Pc4 in this embodiment) have the same width, the detection timing signals (DT1-DTM) (i.e., DT1-DT4 in this embodiment) have the same waveform, and the pulses of the detection timing signals (DT1-DTM) (i.e., DT1-DT4 in this embodiment) have the same width, but the disclosure is not limited to such an example.

When the clamp signals (CS1-CSN) (i.e., CS1-CS4 in this embodiment) have waveforms as shown in FIG. 4, the voltage at the output terminal (Q1) of the current driver 311 of the $j^{th}$ one of the data driving circuits 31 has a waveform ($NV_{Q1}$) if none of the LEDs 113 in the $j^{th}$ one of the columns is short circuited, and has a waveform ($SV_{Q1}$) only if the LED 113 in a second one of the rows and the $j^{th}$ one of the columns is short circuited, where 1≤j≤M (i.e., 1≤j≤4 in this embodiment). The waveform ($NV_{Q1}$) has a peak that is equal to a magnitude of the clamp voltage (Vc1), and a valley that is equal to a magnitude of the input voltage (Vin) minus a magnitude of a forward voltage of each of the LEDs 113. The waveform ($SV_{Q1}$) is substantially identical to a waveform (Vsw2) of a voltage at the scan line 111 connected to the LEDs 113 in the second one of the rows, and has a peak that is equal to the magnitude of the input voltage (Vin) and a valley that is equal to a magnitude of the clamp voltage (Vc2). In the case where the LED 113 in the second one of the rows and the $j^{th}$ one of the columns is short circuited, the voltage at the output terminal (Q1) of the current driver 311 of the $j^{th}$ one of the data driving circuits 31, because it is affected by the input voltage (Vin), is greater in magnitude during the scan time interval (Si) of a second one of the scan driving circuits 21 when compared to the situation where none of the LEDs 113 in the $j^{th}$ one of the columns is short circuited. Additionally, in this case, the voltage at the output terminal (Q1) of the current driver 311 of the $j^{th}$ one of the data driving circuits 31 is greater than the predetermined reference voltage (Vr) in magnitude while within the pulse of the detection timing signal (DTj) that corresponds to the second one of the scan driving circuits 21, and as a consequence, the detection signal (Dr2) is at the logic "1" voltage level while within the pulse of the detection timing signal (DTj) that corresponds to the second one of the scan driving circuits 21, and is at the logic "0" voltage level while outside the pulse of the detection timing signal (DTj) that corresponds to the second one of the scan driving circuits 21, so as to indicate that the LED 113 in the second one of the rows and the $j^{th}$ one of the columns is short circuited. When the clamp signals (CS1-CSN) (i.e., CS1-CS4 in this embodiment) have waveforms as shown in FIG. 6, the voltage at the output terminal (Q1) of the current driver 311 of the $j^{th}$ one of the data driving circuits 31 will have a waveform ($SV_{Q1}'$) and the voltage at the scan line 111 connected to the LEDs 113 in the second one of the rows will have a waveform (Vsw2') only if the LED 113 in the second one of the rows and the $j^{th}$ one of the columns is short circuited. In this case, the voltage at the output terminal (Q1) of the current driver 311 of the $j^{th}$ one of the data driving circuits 31 and the voltage at the scan line 111 connected to the LEDs 113 in the second one of the rows are not affected by the clamp voltage (Vc2) and each of the waveforms ($SV_{Q1}'$, Vsw2') is substantially identical to the waveform ($NV_{Q1}$) during a time segment (Ct) of the clamp time interval (Ci) of the second one of the scan driving circuits 21 coming after/following the clamp time segment (t1) of the clamp time interval (Ci) of the second one of the scan driving circuits 21, and as a consequence, the LEDs 113 in the $j^{th}$ one of the columns would not be always bright or always dark, so as to prevent the occurrence of the short circuit caterpillar phenomenon in the LED array 1.

It should be noted that, in a design phase of the scan-type display apparatus of this embodiment, the widths of the pulses of the detection timing signals (DT1-DTM) should be properly selected based on a magnitude of the predetermined reference voltage (Vr). As shown in FIG. 4, in an example where the predetermined reference voltage (Vr) is smaller than the input voltage (Vin) and greater than the clamp voltage (Vc1) in magnitude, the width of each of the pulses of the detection timing signal (DTj) may approximate the time length of the scan time interval (Si) of the corresponding scan driving circuit 21, where 1≤j≤M (i.e., 1≤j≤4 in this embodiment). As shown in FIG. 5, in another example where the magnitude of the predetermined reference voltage (Vr) is smaller than the magnitude of the clamp voltage (Vc2) and greater than the magnitude of the input voltage (Vin) minus the magnitude of the forward voltage of each of the LEDs 113, the width of the pulse of the detection timing signal (DTj) that corresponds to the $k^{th}$ one of the scan driving circuits 21 is smaller than or equal to the width of the pulse of the pulse width control signal (Pcj) that corresponds to the $k^{th}$ one of the scan driving circuits 21, where 1≤k≤N (i.e., 1≤k≤4 in this embodiment).

Figure 7:
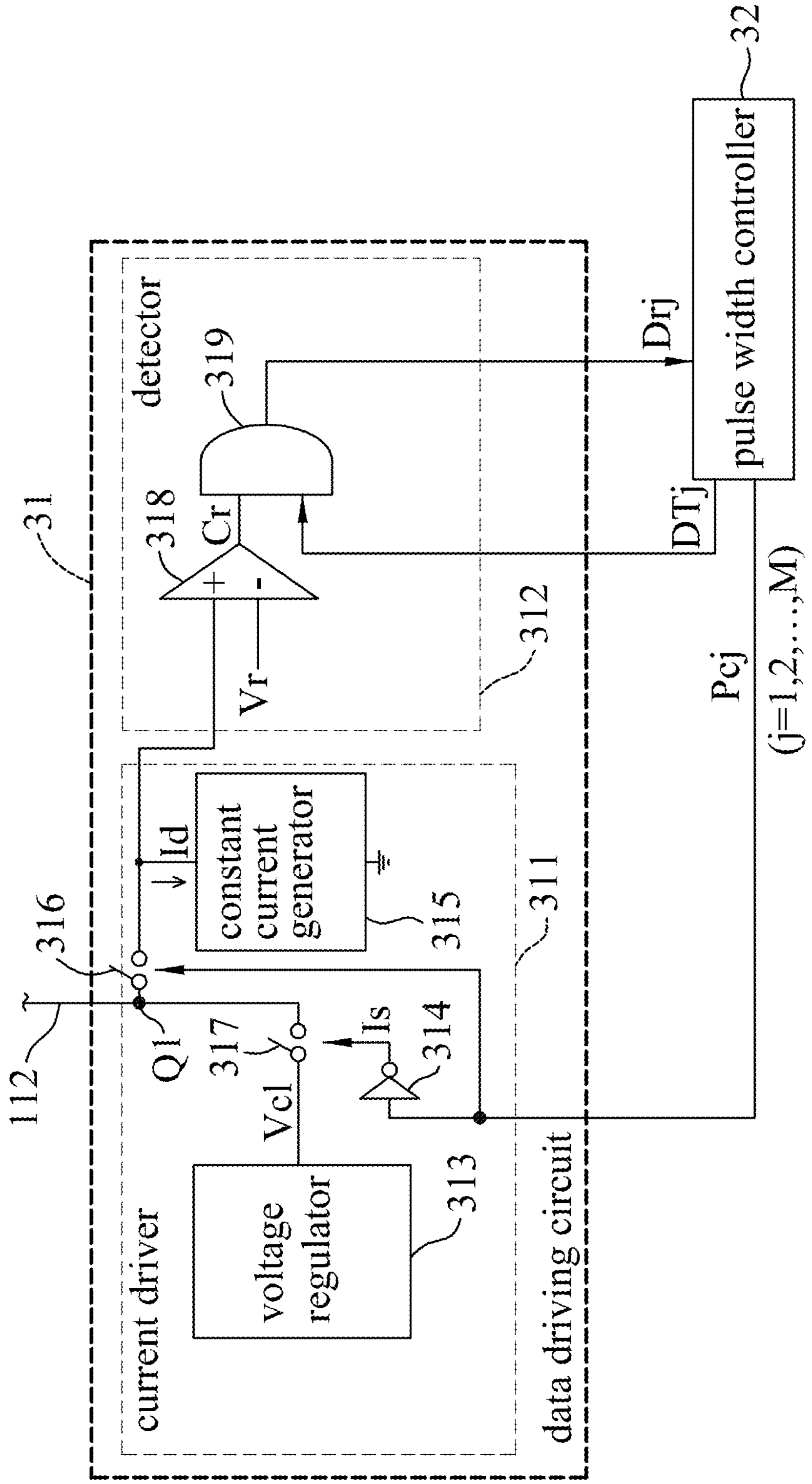
FIG. 7 is a circuit block diagram illustrating a data driving circuit of a second embodiment of the scan-type display apparatus according to the disclosure.

Referring to FIGS. 1 and 7, a second embodiment of the scan-type display apparatus according to the disclosure is similar to the first embodiment as shown in FIGS. 1 and 3, but differs from the first embodiment in what will be described below.

In the second embodiment, with respect to each of the data driving circuits 31, the first input terminal of the comparator 318 is connected to the second terminal of the first switch 316, instead of to the output terminal (Q1) of the current driver 311, and receives a voltage at the second terminal of the first switch 316 to serve as the feed-in voltage. In addition, the width of the pulse of the detection timing signal (DTj) that corresponds to the $k^{th}$ one of the scan driving circuits 21 is smaller than or equal to the width of the pulse of the pulse width control signal (Pcj) that corresponds to the $k^{th}$ one of the scan driving circuits 21, where 1≤j≤M and 1≤k≤N.

Figure 8:
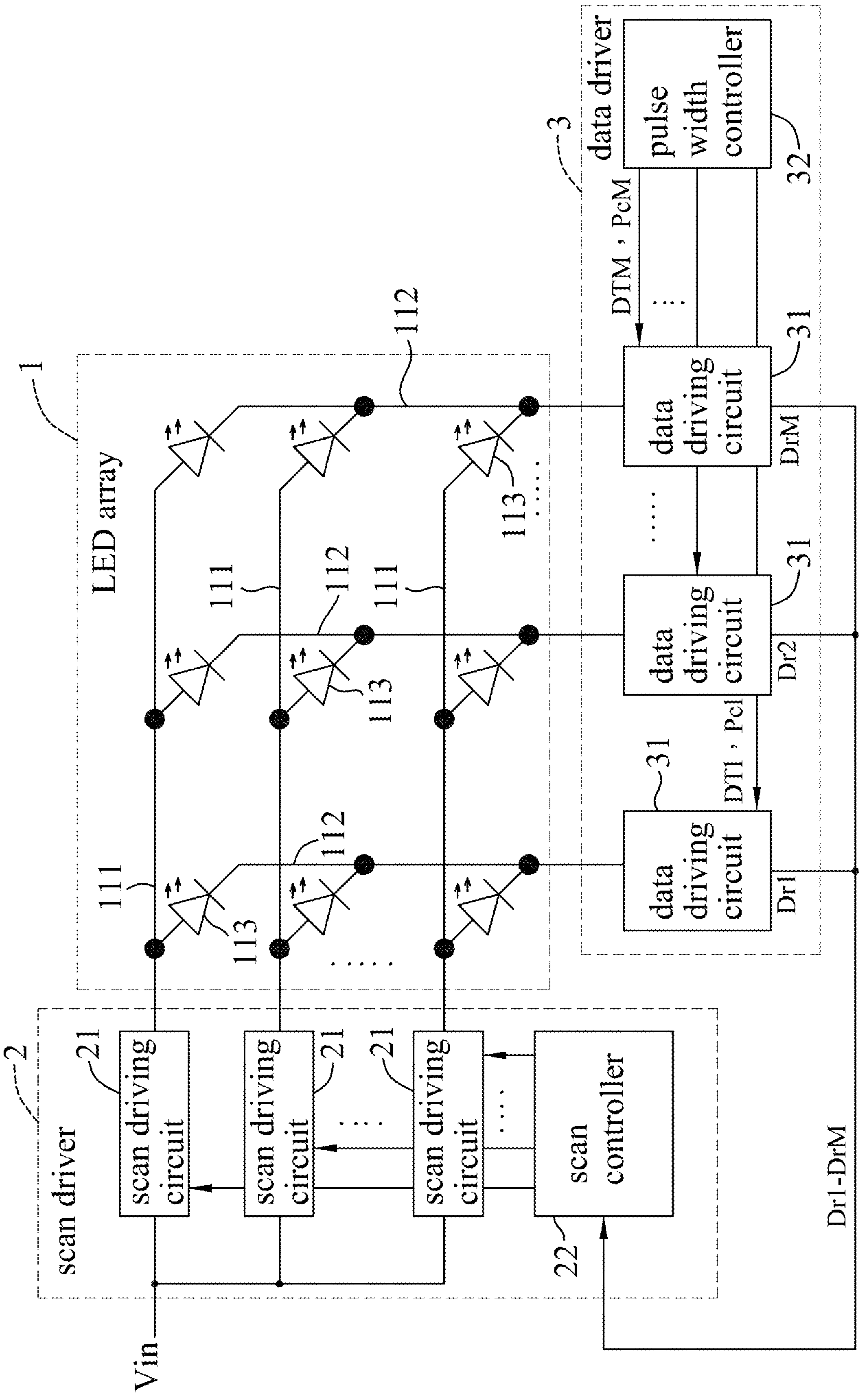
FIGS. 8 to 17 are circuit block diagrams respectively illustrating third to twelfth embodiments of the scan-type display apparatus according to the disclosure.

Referring to FIGS. 3 and 8, a third embodiment of the scan-type display apparatus according to the disclosure is similar to the first embodiment as shown in FIG. 1, but differs from the first embodiment in what will be described below.

In the third embodiment, the pulse width controller 3 is not connected to the output terminals of the logic gates 319 of the detectors 312 of the data driving circuits 31, and does not receive the detection signals (Dr1-DrM) respectively generated by the detectors 312 from the output terminals of the logic gates 319. The scan controller 22 is connected to the output terminals of the logic gates 319, instead of to the pulse width controller 32, and receives the detection signals (Dr1-DrM) respectively generated by the detectors 312 from the output terminals of the logic gates 319.

Referring to FIGS. 1, 2, 3 and 9, a fourth embodiment of the scan-type display apparatus according to the disclosure is similar to the first embodiment as shown in FIG. 1, but differs from the first embodiment in what will be described below.

In the fourth embodiment, the scan-type display apparatus includes a scan driver 2, a number (S) of data drivers 3 and a number (S) of LED arrays 1, where S≥2. The LED arrays 1 are arranged in a matrix that has a row corresponding to the scan driver 2 and a number (S) of columns respectively corresponding to the data drivers 3. With respect to the row of the LED arrays 1, the second terminals of the scan switches 211 of the scan driving circuits 21 of the corresponding scan driver 2 are respectively connected to the scan lines 111 of each of the LED arrays 1 in the row. With respect to each of the columns of the LED arrays 1, the output terminals (Q1) of the current drivers 311 of the data driving circuits 31 of the corresponding data driver 2 are respectively connected to the data lines 112 of the LED array 1 in the column. The pulse width controllers 32 of the data drivers 3 are in a cascade connection. The scan controller 22 is connected to the pulse width controller 32 of an $S^{th}$ one of the data drivers 3. The pulse width controller 32 of a first one of the data drivers 3 outputs the detection signals respectively generated by the data driving circuits 31 of the first one of the data drivers 3. The pulse width controller 32 of an $s^{th}$ one of the data drivers 3 receives the detection signals outputted by the pulse width controller 32 of an $(s-1)^{th}$ one of the data drivers 3, and outputs the detection signals received from the pulse width controller 32 of the $(s-1)^{th}$ one of the data drivers 3 and the detection signals respectively generated by the data driving circuits 31 of the $s^{th}$ one of the data drivers 3, where $2 \leq s \leq S-1$. The pulse width controller 32 of the $S^{th}$ one of the data drivers 3 receives the detection signals outputted by the pulse width controller 32 of an $(S-1)^{th}$ one of the data drivers 3, and outputs the detection signals received from the pulse width controller 32 of the $(S-1)^{th}$ one of the data drivers 3 and the detection signals respectively generated by the data driving circuits 31 of the $S^{th}$ one of the data drivers 3 for receipt by the scan controller 22.

Figure 9:
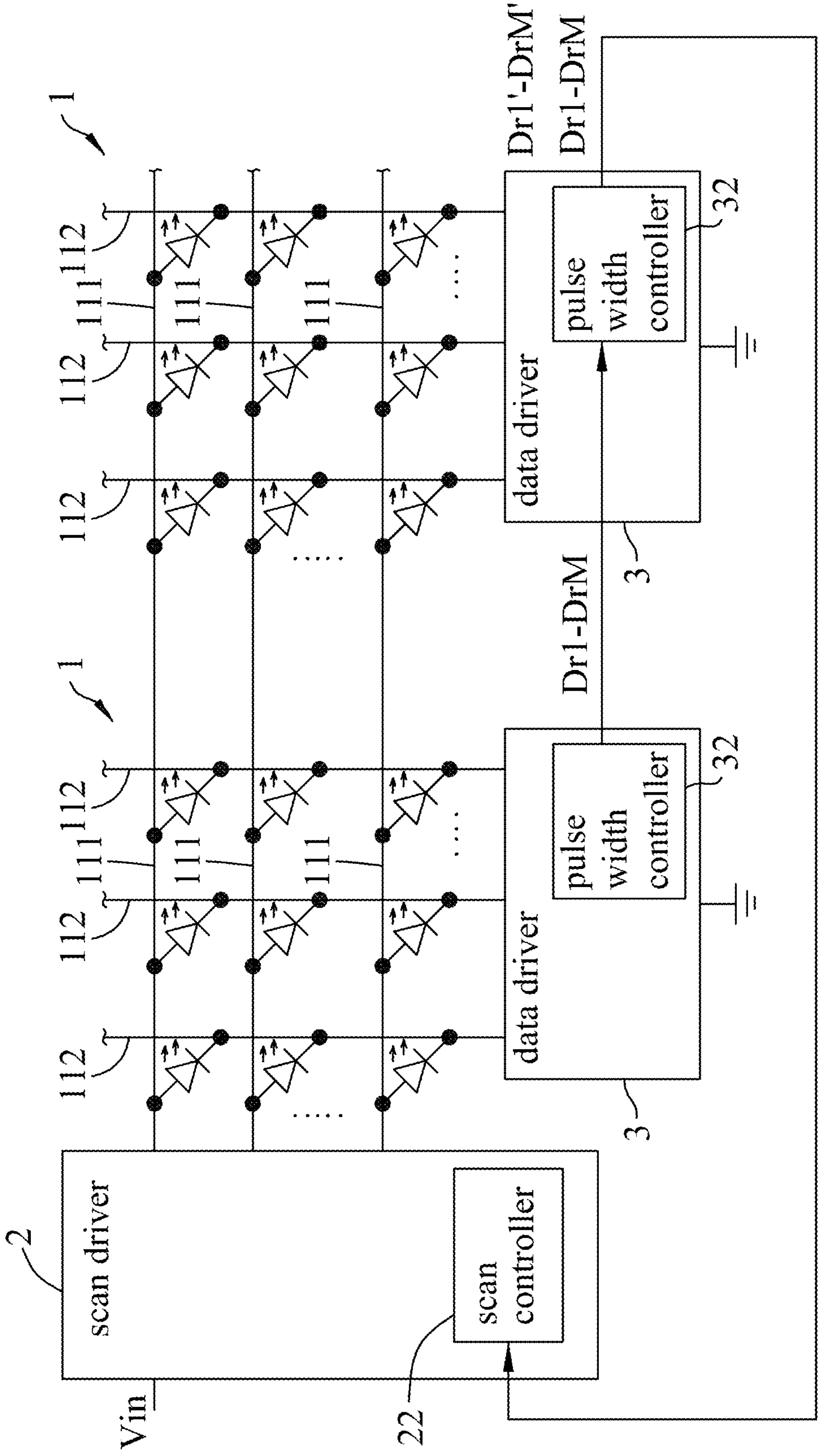

FIG. 9 depicts an example where S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 receives the detection signals (Dr1-DrM) outputted by the pulse width controller 32 of the first one of the data drivers 3, and outputs the detection signals (Dr1-DrM) received from the pulse width controller 32 of the first one of the data drivers 3 and the detection signals (Dr1'-DrM') respectively generated by the data driving circuits 31 of the second one of the data drivers 3 for receipt by the scan controller 22.

Referring to FIGS. 1, 2, 3 and 10, a fifth embodiment of the scan-type display apparatus according to the disclosure is similar to the fourth embodiment as shown in FIG. 9, but differs from the fourth embodiment in what will be described below.

In the fifth embodiment, the scan-type display apparatus includes a number (R) of scan drivers 2, a number (S) of data drivers 3 and a number (R×S) of LED arrays 1, where $R \geq 2$ and $S \geq 2$. The LED arrays 1 are arranged in a matrix that has a number (R) of rows respectively corresponding to the scan driver 2 and a number (S) of columns respectively corresponding to the data drivers 3. With respect to each of the rows of the LED arrays 1, the second terminals of the scan switches 211 of the scan driving circuits 21 of the corresponding scan driver 2 are respectively connected to the scan lines 111 of each of the LED arrays 1 in the row. With respect to each of the columns of the LED arrays 1, the output terminals (Q1) of the current drivers 311 of the data driving circuits 31 of the corresponding data driver 2 are respectively connected to the data lines 112 of each of the LED arrays 1 in the column. The scan controller 22 of each of the scan drivers 2 is connected to the pulse width controller 32 of the $S^{th}$ one of the data drivers 3 to receive the detection signals outputted by the $S^{th}$ one of the data drivers 3.

Figure 10:
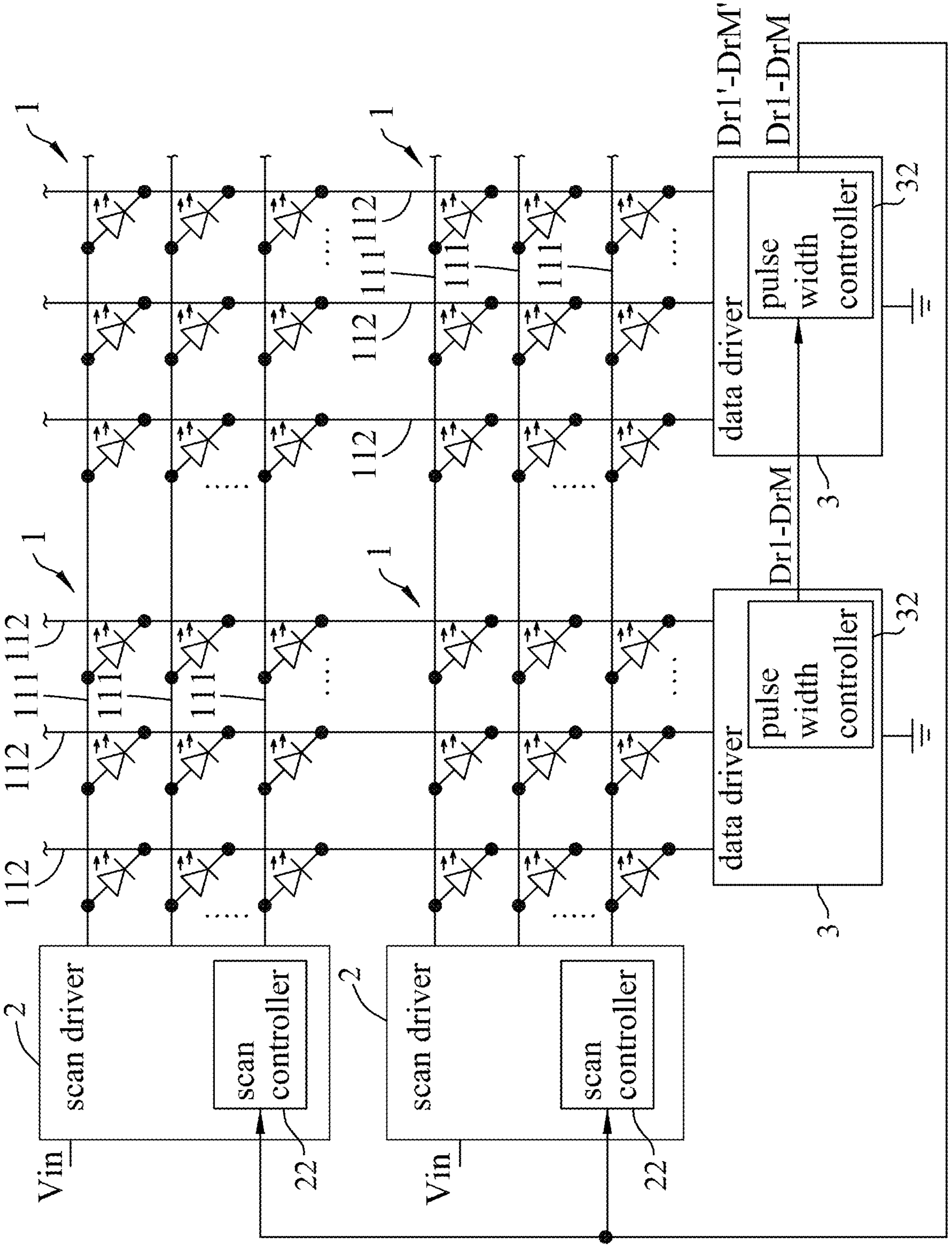

FIG. 10 depicts an example where R=2 and S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 receives the detection signals (Dr1-DrM) outputted by the pulse width controller 32 of the first one of the data drivers 3, and outputs the detection signals (Dr1-DrM) received from the pulse width controller 32 of the first one of the data drivers 3 and the detection signals (Dr1'-DrM') respectively generated by the data driving circuits 31 of the second one of the data drivers 3 for receipt by the scan controller 22 of each of the scan drivers 2.

Figure 11:
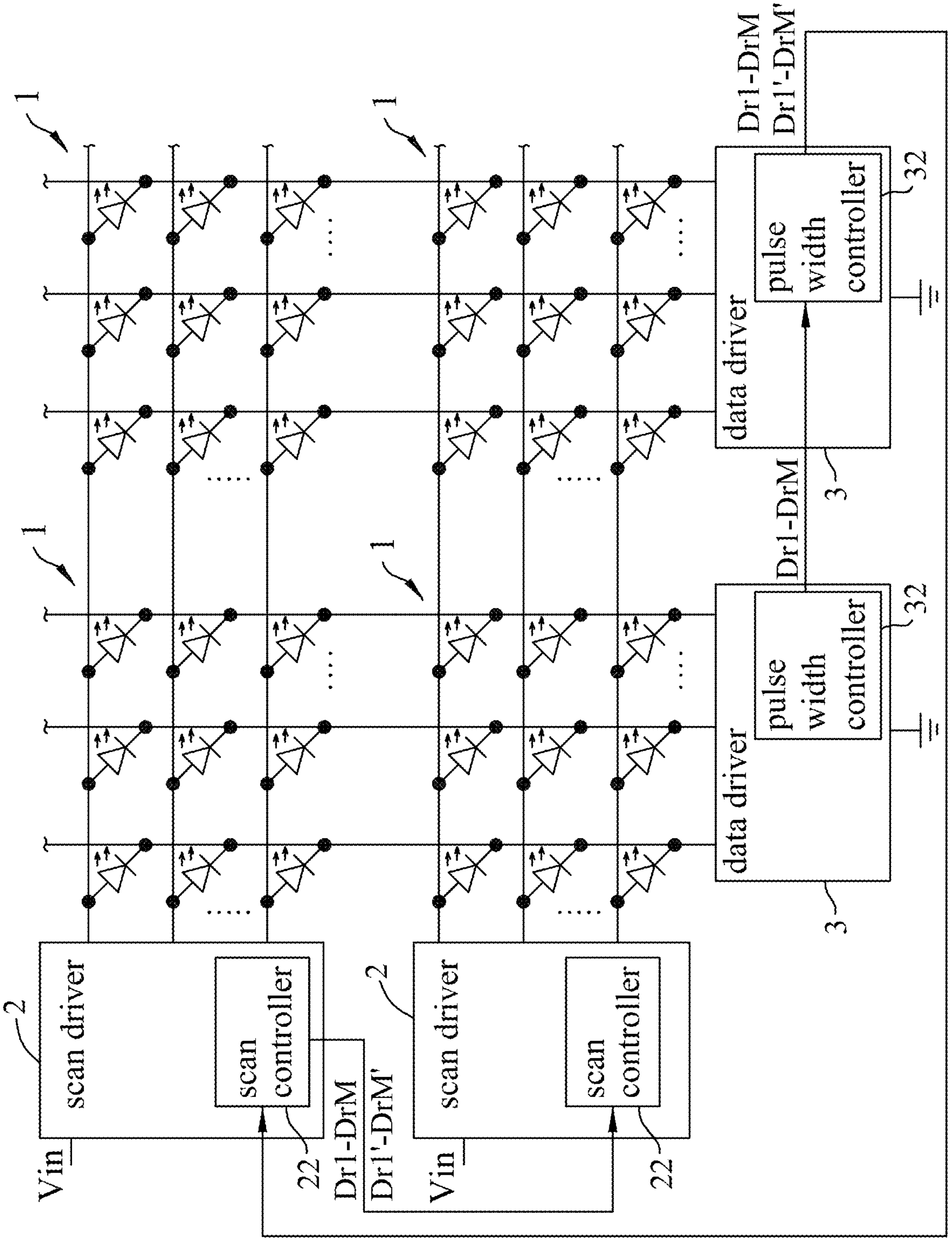

Referring to FIGS. 1 and 11, a sixth embodiment of the scan-type display apparatus according to the disclosure is similar to the fifth embodiment as shown in FIG. 10, but differs from the fifth embodiment in what will be described below.

In the sixth embodiment, the scan controllers 22 of the scan drivers 2 are in a cascade connection, and only the scan controller 22 of a first one of the scan drivers 2 is connected to the pulse width controller 32 of the $S^{th}$ one of the data drivers 3. The scan controller 22 of the first one of the scan drivers 2 receives the detection signals outputted by the pulse width controller 32 of the $S^{th}$ one of the data drivers 3, and outputs the detection signals received from the pulse width controller 32 of the $S^{th}$ one of the data drivers 3. The scan controller 22 of an $r^{th}$ one of the scan drivers 2 is connected to the scan controller 22 of an $(r-1)^{th}$ one of the scan drivers 2 to receive the detection signals outputted by the scan controller 22 of the $(r-1)^{th}$ one of the scan drivers 2, and outputs the detection signals received from the scan controller 22 of the $(r-1)^{th}$ one of the scan drivers 2, where $2 \leq r \leq R-1$. The scan controller 22 of an $R^{th}$ one of the scan drivers 2 receives the detection signals outputted by the scan controller 22 of an $(R-1)^{th}$ one of the scan drivers 2.

FIG. 11 depicts an example where R=2 and S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 receives the detection signals (Dr1-DrM) outputted by the pulse width controller 32 of the first one of the data drivers 3, and outputs the detection signals (Dr1-DrM) received from the pulse width controller 32 of the first one of the data drivers 3 and the detection signals (Dr1'-DrM') respectively generated by the data driving circuits 31 of the second one of the data drivers 3. The scan controller 22 of the first one of the scan drivers 2 receives the detection signals (Dr1-DrM, Dr1'-DrM') outputted by the pulse width controller 32 of the second one of the data drivers 3, and outputs the detection signals (Dr1-DrM, Dr1'-DrM') received from the pulse width controller 32 of the second one of the data drivers 3. The scan controller 22 of the second one of the scan drivers 2 receives the detection signals (Dr1-DrM, Dr1'-DrM') outputted by the scan controller 22 of the first one of the scan drivers 2.

Figure 12:
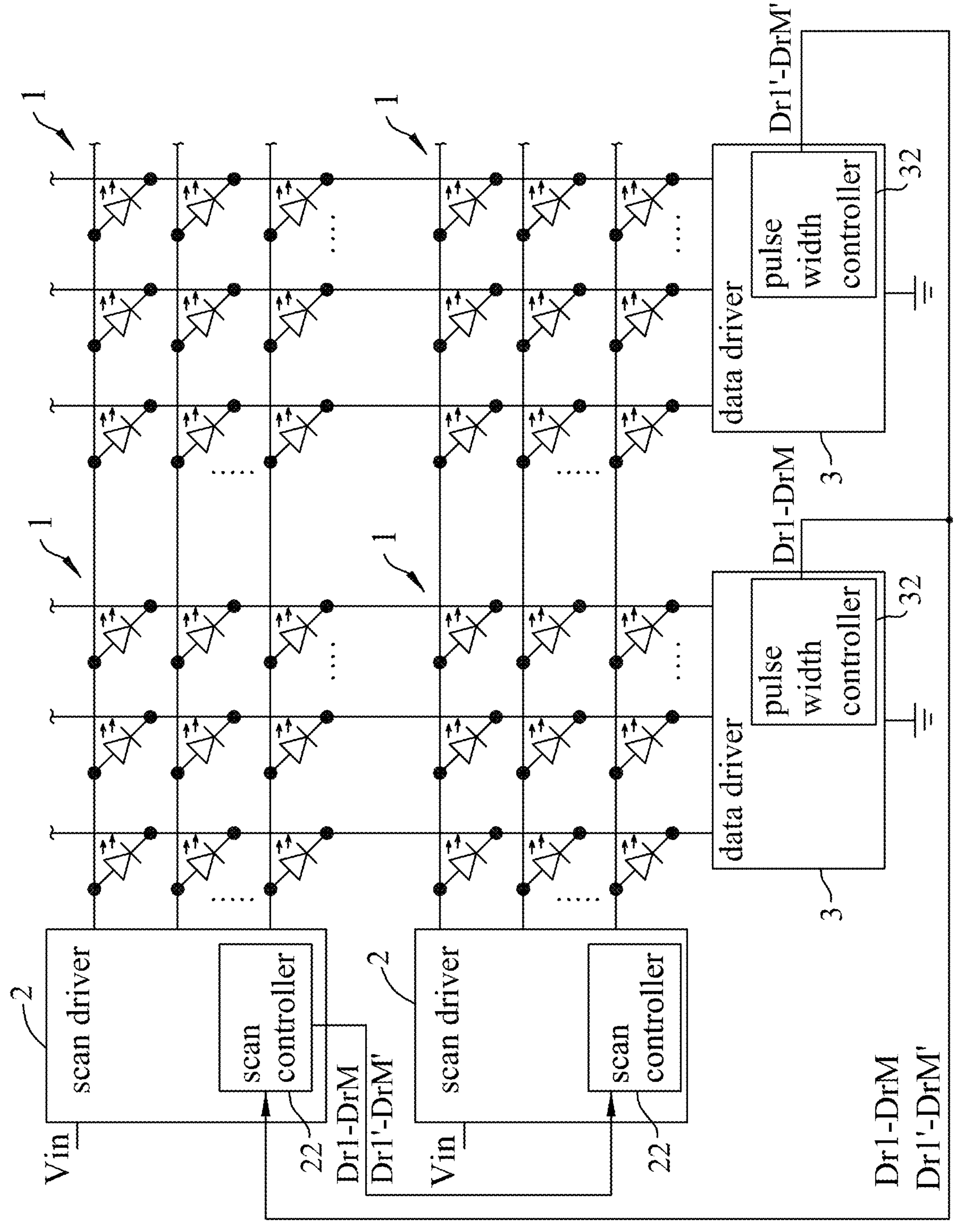

Referring to FIGS. 1 and 12, a seventh embodiment of the scan-type display apparatus according to the disclosure is similar to the sixth embodiment as shown in FIG. 11, but differs from the sixth embodiment in what will be described below.

In the seventh embodiment, the pulse width controllers 32 of the data drivers 3 are not in a cascade connection. The pulse width controllers 32 of the $s^{th}$ one of the data drivers 3 does not receive the detection signals outputted by the $(s-1)^{th}$ one of the data drivers 3, and only outputs the detection signals respectively generated by the data driving circuits 31 of the $s^{th}$ one of the data drivers 3, where 2≤s≤S. The scan controller 22 of the first one of the scan drivers 2 is connected to the pulse width controllers 32 of the data drivers 3 to receive the detection signals outputted by the pulse width controllers 32 of the data drivers 3, and outputs the detection signals received from the pulse width controllers 32 of the data drivers 3.

FIG. 11 depicts an example where R=2 and S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 outputs the detection signals (Dr1'-DrM') respectively generated by the data driving circuits 31 of the second one of the data drivers 3. The scan controller 22 of the first one of the scan drivers 2 receives the detection signals (Dr1-DrM, Dr1'-DrM') outputted by the pulse width controllers 32 of the data drivers 3, and outputs the detection signals (Dr1-DrM, Dr1'-DrM') received from the pulse width controllers 32 of the data drivers 3. The scan controller 22 of the second one of the scan drivers 2 receives the detection signals (Dr1-DrM, Dr1'-DrM') outputted by the scan controller 22 of the first one of the scan drivers 2.

Figure 13:
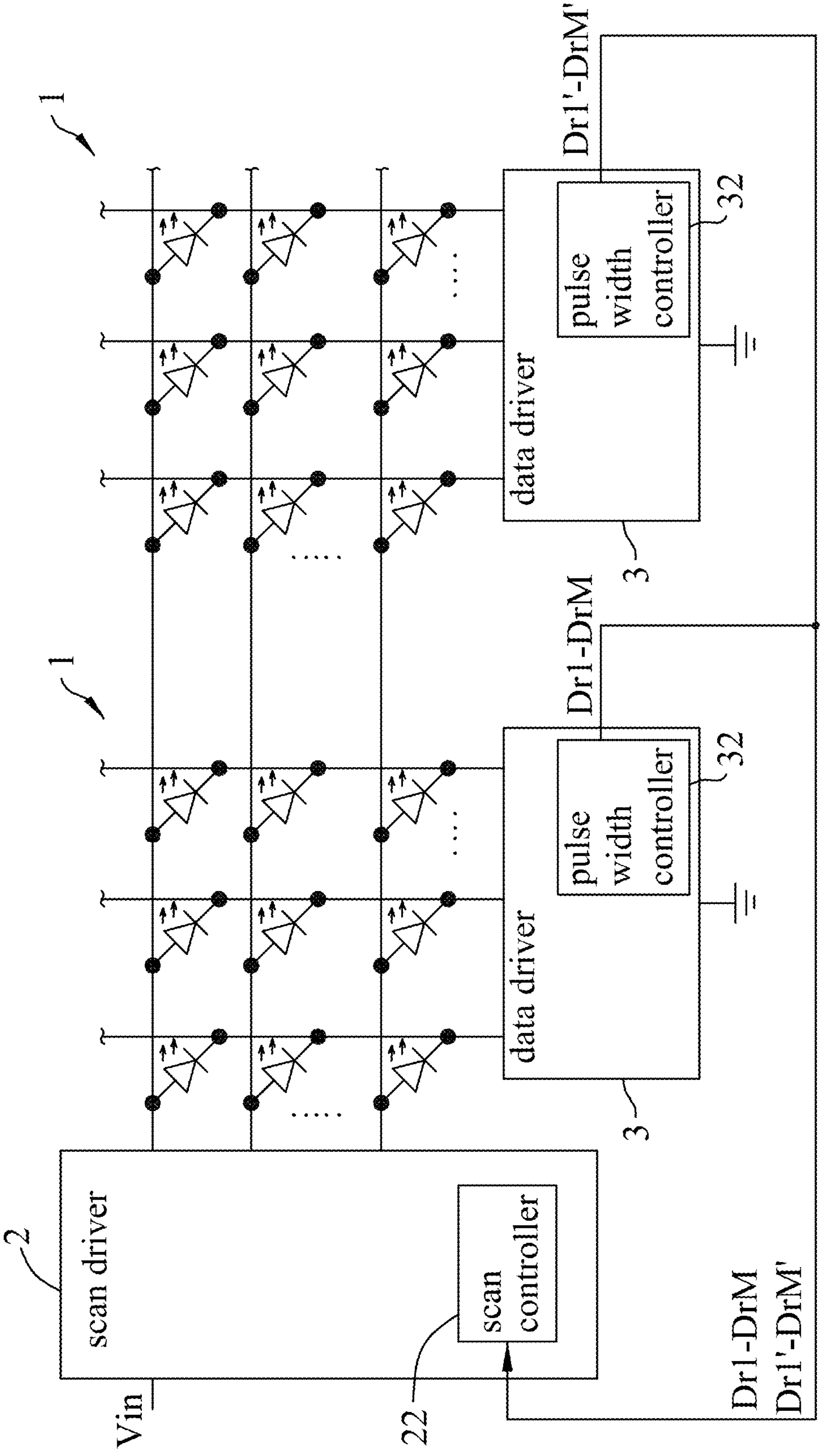

Referring to FIGS. 1 and 13, an eighth embodiment of the scan-type display apparatus according to the disclosure is similar to the fourth embodiment as shown in FIG. 9, but differs from the fourth embodiment in what will be described below.

In the eighth embodiment, the pulse width controllers 32 of the data drivers 3 are not in a cascade connection. The pulse width controllers 32 of the $s^{th}$ one of the data drivers 3 does not receive the detection signals outputted by the $(s-1)^{th}$ one of the data drivers 3, and only outputs the detection signals respectively generated by the data driving circuits 31 of the $s^{th}$ one of the data drivers 3, where 2≤s≤S. The scan controller 22 is connected to the pulse width controllers 32 of the data drivers 3 to receive the detection signals outputted by the pulse width controllers 32 of the data drivers 3.

FIG. 13 depicts an example where S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 outputs the detection signals (Dr1'-DrM') respectively generated by the data driving circuits 31 of the second one of the data drivers 3. The scan controller 22 receives the detection signals (Dr1-DrM, Dr1'-DrM') outputted by the pulse width controllers 32 of the data drivers 3.

Figure 14:
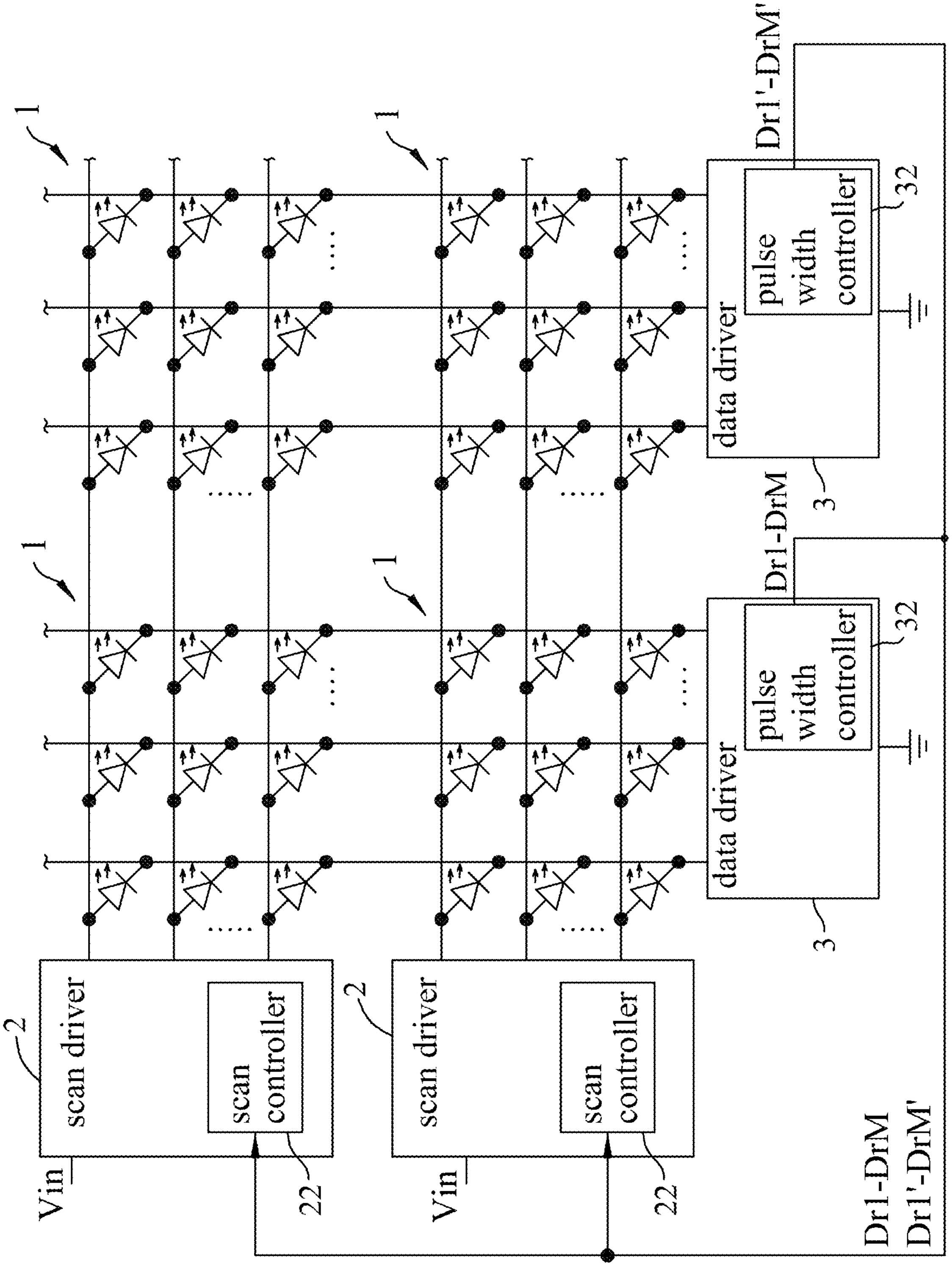

Referring to FIGS. 1 and 14, a ninth embodiment of the scan-type display apparatus according to the disclosure is similar to the fifth embodiment as shown in FIG. 10, but differs from the fifth embodiment in what will be described below.

In the ninth embodiment, the pulse width controllers 32 of the data drivers 3 are not in a cascade connection. The pulse width controllers 32 of the $s^{th}$ one of the data drivers 3 does not receive the detection signals outputted by the $(s-1)^{th}$ one of the data drivers 3, and only outputs the detection signals respectively generated by the data driving circuits 31 of the $s^{th}$ one of the data drivers 3, where 2≤s≤S. The scan controller 22 of each of the scan drivers 2 is connected to the pulse width controllers 32 of the data drivers 3 to receive the detection signals outputted by the pulse width controllers 32 of the data drivers 3.

FIG. 14 depicts an example where R=2 and S=2. In this example, the pulse width controller 32 of the first one of the data drivers 3 outputs the detection signals (Dr1-DrM) respectively generated by the data driving circuit 31 of the first one of the data drivers 3. The pulse width controller 32 of the second one of the data drivers 3 outputs the detection signals (Dr1'-DrM') respectively generated by the data driving circuit 31 of the second one of the data drivers 3. The scan controller 22 of each of the scan drivers 2 receives the detection signals (Dr1-DrM, Dr1'-DrM') outputted by the pulse width controllers 32 of the data drivers 3.

Figure 15:
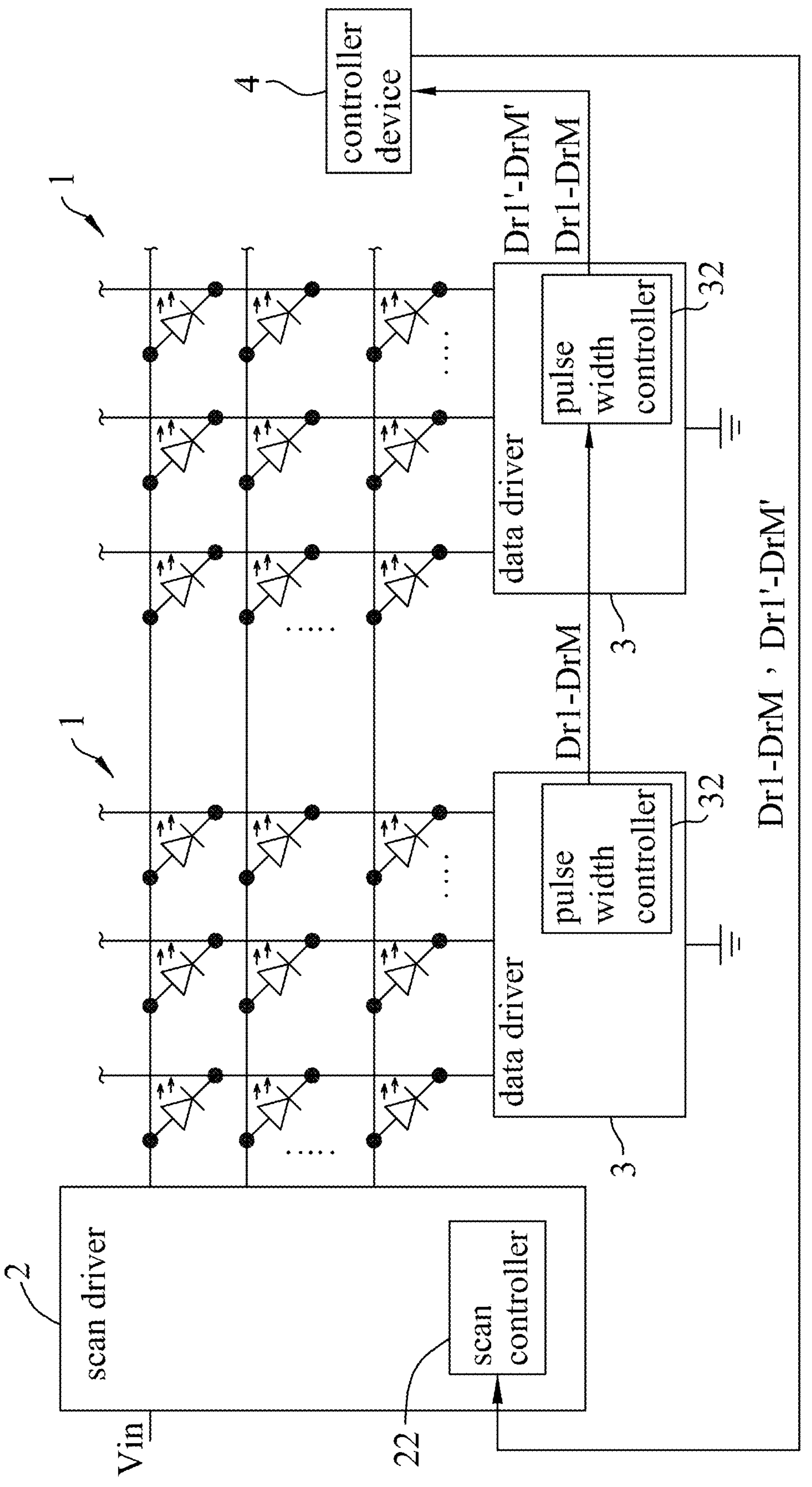

Referring to FIGS. 1 and 15, a tenth embodiment of the scan-type display apparatus according to the disclosure is similar to the fourth embodiment as shown in FIG. 9, but differs from the fourth embodiment in what will be described below.

In the tenth embodiment, the scan-type display apparatus further includes a controller device 4. The controller device 4 is connected between the pulse width controller 32 of the $S^{th}$ one of the data drivers 3 and the scan controller 22, receives the detection signals outputted by the pulse width controller 32 of the $S^{th}$ one of the data drivers 3, and outputs the detection signals received from the pulse width controller 32 of the $S^{th}$ one of the data drivers 3 for receipt by the scan controller 22.

FIG. 15 depicts an example where S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 receives the detection signals (Dr1-DrM) outputted by the pulse width controller 32 of the first one of the data drivers 3, and outputs the detection signals (Dr1-DrM) received from the pulse width controller 32 of the first one of the data drivers 3 and the detection signals (Dr1'-DrM') respectively generated by the data driving circuits 31 of the second one of the data drivers 3. The controller device 4 receives the detection signals (Dr1-DrM, Dr1'-DrM') outputted by the pulse width controller 32 of the second one of the data drivers 3, and outputs the detection signals (Dr1-DrM, Dr1'-DrM') received from the pulse width controller 32 of the second one of the data drivers 3 for receipt by the scan controller 22.

Figure 16:
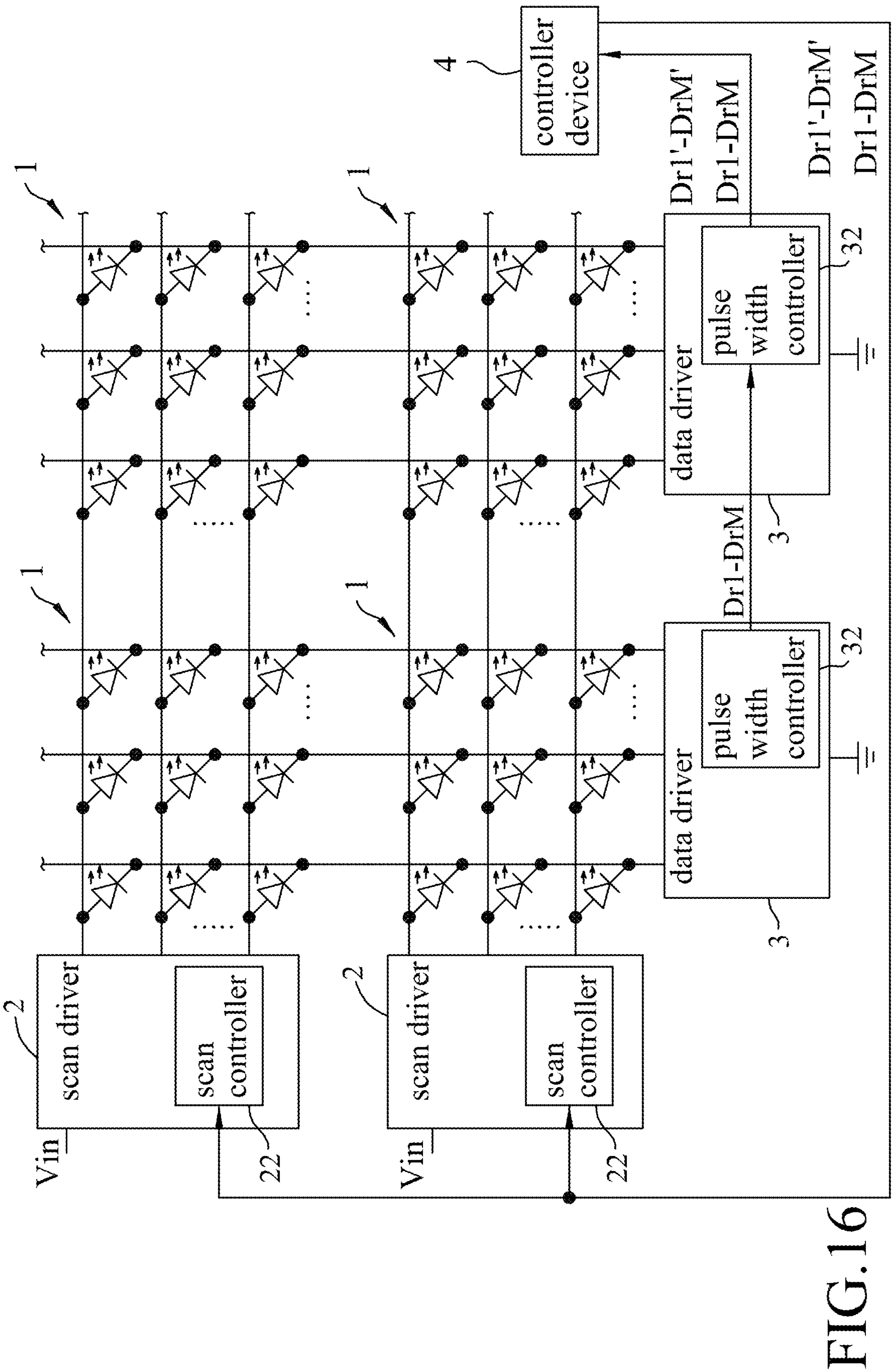

Referring to FIGS. 1 and 16, an eleventh embodiment of the scan-type display apparatus according to the disclosure is similar to the fifth embodiment as shown in FIG. 10, but differs from the fifth embodiment in what will be described below.

In the eleventh embodiment, the scan-type display apparatus further includes a controller device 4. The controller device 4 is connected between the pulse width controller 32 of the $S^{th}$ one of the data drivers 3 and the scan controller 22 of each of the scan drivers 2, receives the detection signals outputted by the pulse width controller 32 of the $S^{th}$ one of the data drivers 3, and outputs the detection signals received from the pulse width controller 32 of the $S^{th}$ one of the data drivers 3 for receipt by the scan controller 22 of each of the scan drivers 2.

FIG. 16 depicts an example where R=2 and S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 receives the detection signals (Dr1-DrM) outputted by the pulse width controller 32 of the first one of the data drivers 3, and outputs the detection signals (Dr1-DrM) received from the pulse width controller 32 of the first one of the data drivers 3 and the detection signals (Dr1'-DrM') respectively generated by the data driving circuits 31 of the second one of the data drivers 3.

The controller device 4 receives the detection signals (Dr1-DrM, Dr1'-DrM') outputted by the pulse width controller 32 of the second one of the data drivers 3, and outputs the detection signals (Dr1-DrM, Dr1'-DrM') received from the pulse width controller 32 of the second one of the data drivers 3 for receipt by the scan controller 22 of each of the scan drivers 2.

Figure 17:
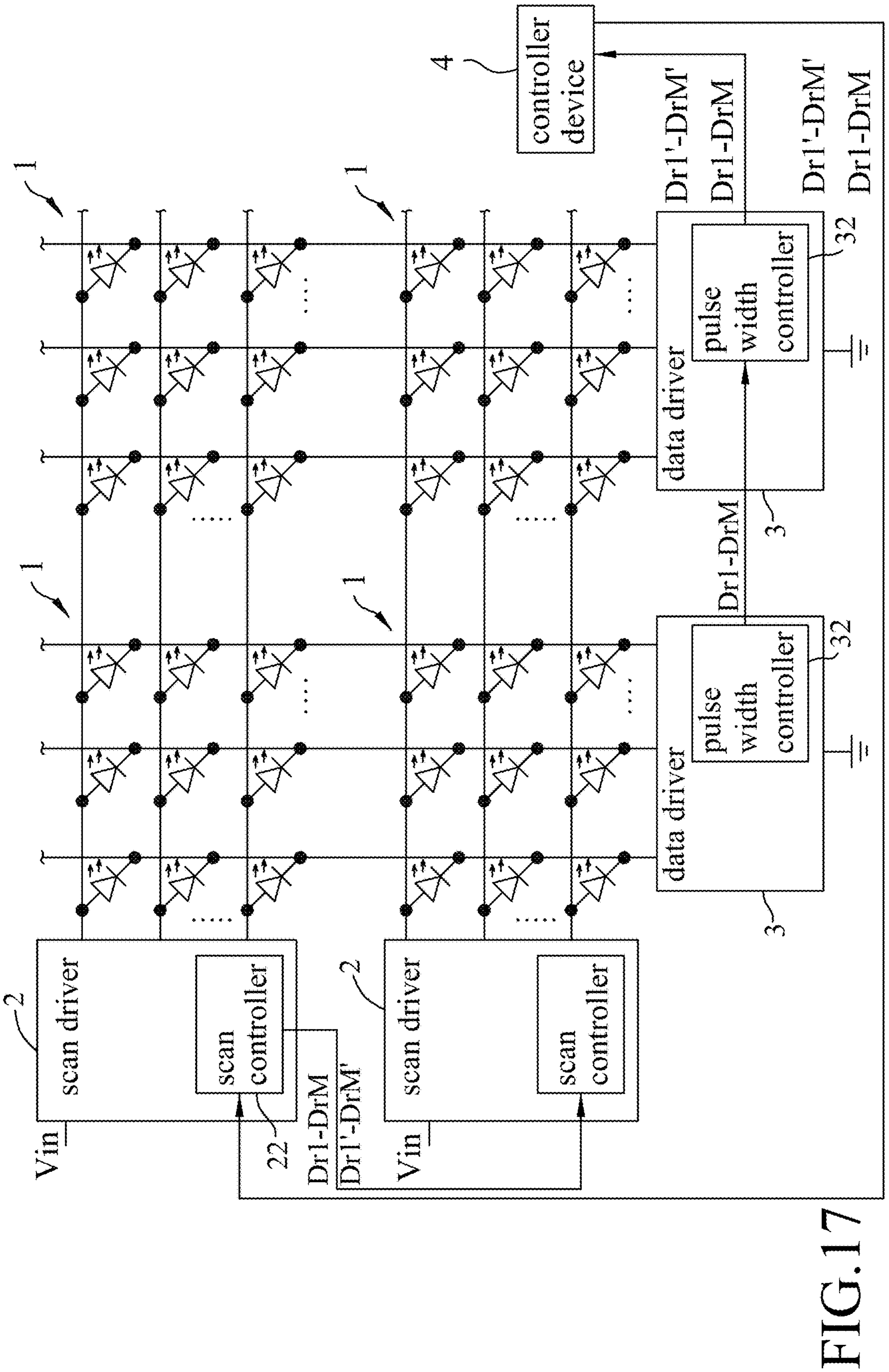

Referring to FIGS. 1 and 17, a twelfth embodiment of the scan-type display apparatus according to the disclosure is similar to the sixth embodiment as shown in FIG. 11, but differs from the sixth embodiment in what will be described below.

In the twelfth embodiment, the scan-type display apparatus further includes a controller device 4. The controller device 4 is connected between the pulse width controller 32 of the $S^{th}$ one of the data drivers 3 and the scan controller 22 of the first one of the scan drivers 2, receives the detection signals outputted by the pulse width controller 32 of the $S^{th}$ one of the data drivers 3, and outputs the detection signals received from the pulse width controller 32 of the $S^{th}$ one of the data drivers 3 for receipt by the scan controller 22 of the first one of the scan drivers 2.

FIG. 17 depicts an example where R=2 and S=2. In this example, the pulse width controller 32 of the first one of the data drivers 3 outputs the detection signals (Dr1-DrM) respectively generated by the data driving circuits 31 of the first one of the data drivers 3. The pulse width controller 32 of the second one of the data drivers 3 receives the detection signals (Dr1-DrM) outputted by the pulse width controller 32 of the first one of the data drivers 3, and outputs the detection signals (Dr1-DrM) received from the pulse width controller 32 of the first one of the data drivers 3 and the detection signals (Dr1'-DrM') respectively generated by the data driving circuits 31 of the second one of the data drivers 3. The controller device 4 receives the detection signals (Dr1-DrM, Dr1'-DrM') outputted by the pulse width controller 32 of the second one of the data drivers 3, and outputs the detection signals (Dr1-DrM, Dr1'-DrM') received from the pulse width controller 32 of the second one of the data drivers 3. The scan controller 22 of the first one of the scan drivers 2 receives the detection signals (Dr1-DrM, Dr1'-DrM') outputted by the controller device 4, and outputs the detection signals (Dr1-DrM, Dr1'-DrM') received from the controller device 4. The scan controller 22 of the second one of the scan drivers 2 receives the detection signals (Dr1-DrM, Dr1'-DrM') outputted by the scan controller 22 of the first one of the scan drivers 2.

In each of the tenth to twelfth embodiments, the controller device 4 generates parameter settings and grayscale data that are required by the scan driver(s) 2 and the data drivers 3 to properly drive the LED arrays 1. The operations of the controller device 4 are known to those skilled in the art, and the salient features of the disclosure do not reside in these operations, so details of these operations are omitted herein for the sake of brevity.

In view of the above, for each of the first to twelfth embodiments, the scan-type display apparatus can eliminate short circuit caterpillar phenomenon of the LED array(s) 1. In addition, the data driver(s) 3 output(s) the detection signals generated by the data driving circuits 31 of the data driver(s) 3 for receipt by the scan controller(s) 22 of the scan driver(s) 2 and/or the controller device 4, so as to inform the scan controller(s) 22 of the scan driver(s) 2 and/or the controller device 4 whether any one of the LEDs 113 connected to any one of the data lines 112 is short circuited.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A scan-type display apparatus comprising:
- a light emitting diode (LED) array having a common anode configuration, and including
  - a plurality of scan lines,
  - a plurality of data lines, and
  - a plurality of LEDs arranged in a matrix that has a plurality of rows respectively corresponding to said scan lines and a plurality of columns respectively corresponding to said data lines,
  - with respect to each of said rows, anodes of said LEDs in said row being connected to said scan line that corresponds to said row,
  - with respect to each of said columns, cathodes of said LEDs in said column being connected to said data line that corresponds to said column; and
- a data driver including a plurality of data driving circuits that respectively correspond to said data lines, each of said data driving circuits including
  - a current driver having an output terminal that is connected to said data line corresponding to said data driving circuit, receiving a pulse width control signal, and outputting one of a drive current and a first clamp voltage at said output terminal of said current driver based on the pulse width control signal, and
  - a detector connected to said current driver to receive a feed-in voltage related to a voltage at said output terminal of said current driver, further receiving a detection timing signal, and generating a detection signal that indicates whether any one of said LEDs connected to said data line corresponding to said data driving circuit is short circuited based on the feed-in voltage and the detection timing signal;

wherein, with respect to each of said data driving circuits, said detector is connected to said output terminal of said current driver, and receives the voltage at said output terminal of said current driver to serve as the feed-in voltage, and said current driver includes a voltage regulator generating the first clamp voltage, an inverter receiving the pulse width control signal, and generating an inverted control signal that is a logical complement of the pulse width control signal in logic value, a constant current generator generating the drive current, a first switch having a first terminal that is connected to said output terminal of said current driver, a second terminal that is connected to said constant current generator, and a control terminal that receives the pulse width control signal, said first switch, when conducting based on the pulse width control signal, permitting flow of the drive current therethrough, and a second switch having a first terminal that is connected to said voltage regulator, a second terminal that is connected to said output terminal of said current driver, and a control terminal that is connected to said inverter to receive the inverted control signal, said second switch, when conducting based on the inverted control signal, permitting transmission of the first clamp voltage therethrough.

2. The scan-type display apparatus as claimed in claim 1, wherein, with respect to each of said data driving circuits, said detector includes:

a comparator having a first input terminal that is connected to said current driver to receive the feed-in voltage, a second input terminal that receives a predetermined reference voltage, and an output terminal that provides a comparison signal; and a logic gate having a first input terminal that is connected to said output terminal of said comparator to receive the comparison signal, a second input terminal that receives the detection timing signal, and an output terminal that provides the detection signal.

3. A scan-type display apparatus comprising:

a light emitting diode (LED) array having a common anode configuration, and including a plurality of scan lines, a plurality of data lines, and a plurality of LEDs arranged in a matrix that has a plurality of rows respectively corresponding to said scan lines and a plurality of columns respectively corresponding to said data lines, with respect to each of said rows, anodes of said LEDs in said row being connected to said scan line that corresponds to said row, with respect to each of said columns, cathodes of said LEDs in said column being connected to said data line that corresponds to said column; and a data driver including a plurality of data driving circuits that respectively corresponds to said data lines, each of said data driving circuits including a current driver having an output terminal that is connected to said data line corresponding to said data driving circuit, receiving a pluse width control signal, and outputting one of a drive current and a first clamp voltage at said output terminal of said current driver based on the pulse width control signal, and a detector connected to said current driver to receive a feed-in voltage related to a voltage at said output terminal of said current driver, further receiving a detection timing signal, and generating a detection signal that indicates whether any one of said LEDs connected to said data line corresponding to said data driving circuit is short circuited based on the feed-in voltage and the detection timing signal;

wherein, with respect to each of said data driving circuits, said current driver includes:

a voltage regulator generating the first clamp voltage;

an inverter receiving the pulse width control signal, and generating an inverted control signal that is a logical complement of the pulse width control signal in logic value;

a constant current generator generating the drive current;

a first switch having a first terminal that is connected to said output terminal of said current driver, a second terminal that is connected to said constant current generator, and a control terminal that receives the pulse width control signal, said first switch, when conducting based on the pulse width control signal, permitting flow of the drive current therethrough; and a second switch having a first terminal that is connected to said voltage regulator, a second terminal that is connected to said output terminal of said current driver, and a control terminal that is connected to said inverter to receive the inverted control signal, said second switch, when conducting based on the inverted control signal, permitting transmission of the first clamp voltage therethrough from said voltage regulator to said output terminal of said current driver, and said detector is connected to said second terminal of said first switch, and receives a voltage at said second terminal of said first switch to serve as the feed-in voltage.

4. The scan-type display apparatus as claimed in claim 1, further comprising a scan driver, wherein:

said scan driver includes a scan controller, and a plurality of scan driving circuits that respectively correspond to said scan lines;

said scan controller receives the detection signals respectively generated by said detectors of said data driving circuits, and generates a plurality of scan signals that respectively correspond to said scan driving circuits and a plurality of clamp signals that respectively correspond to said scan driving circuits, with the clamp signals dependent on the detection signals;

each of said scan driving circuits is connected to said scan line corresponding to said scan driving circuit, is further connected to said scan controller to receive the scan signal corresponding to said scan driving circuit and the clamp signal corresponding to said scan driving circuit, and further receives an input voltage; and each of said scan driving circuits is operable to output or not output the input voltage to said scan line corresponding to said scan driving circuit based on the scan signal corresponding to said scan driving circuit, and is operable to output or not output a second clamp voltage to said scan line corresponding to said scan driving circuit based on the clamp signal corresponding to said scan driving circuit.

5. The scan-type display apparatus as claimed in claim 4, wherein each of said scan driving circuits includes:

a scan switch having a first terminal that receives the input voltage, a second terminal that is connected to said scan line corresponding to said scan driving circuit, and a control terminal that receives the scan signal corresponding to said scan driving circuit;

a voltage regulator generating the second clamp voltage; and a clamp switch having a first terminal that is connected to said voltage regulator to receive the second clamp voltage, a second terminal that is connected to said second terminal of said scan switch, and a control terminal that receives the clamp signal corresponding to said scan driving circuit.

6. The scan-type display apparatus as claimed in claim 4, wherein:

said data driver further includes a pulse width controller that is connected to said scan controller and said current drivers and said detectors of said data driving circuits; and said pulse width controller generating the pulse width control signals to be respectively received by said current drivers and the detection timing signals to be respectively received by said detectors, receiving the detection signals respectively generated by said detectors, and outputting the detection signals respectively received from said detectors for receipt by said scan controller.

7. The scan-type display apparatus as claimed in claim 4, wherein:

said data driver further includes a pulse width controller that is connected to said current drivers and said detectors of said data driving circuits;

said pulse width controller generating the pulse width control signals to be respectively received by said current drivers and the detection timing signals to be respectively received by said detectors; and said scan controller is connected to said detectors to receive the detection signals respectively generated by said detectors.

8. The scan-type display apparatus as claimed in claim 4, wherein:

with respect to each of said scan driving circuits, said scan driving circuit has an operation cycle that includes a scan time interval and a clamp time interval, the scan signal corresponding to said scan driving circuit is at a voltage level corresponding to conduction of said scan switch during the scan time interval, and is at a voltage level corresponding to non-conduction of said scan switch during the clamp time interval, and when the detection signals cooperatively indicate that none of said LEDs connected to said scan line corresponding to said scan driving circuit is short circuited, the clamp signal corresponding to said scan driving circuit is at a voltage level corresponding to non-conduction of said clamp switch during the scan time interval, and is at a voltage level corresponding to conduction of said clamp switch during the clamp time interval; and with respect to each of said data driving circuits, the detection timing signal includes a plurality of pulses, which respectively correspond to said scan driving circuits, each of which appears in the scan time interval of said scan driving circuit corresponding to the pulse, and each of which has a width smaller than a time length of the scan time interval of said scan driving circuit corresponding to the pulse, and said detector detects whether any one of said LEDs connected to said data line corresponding to said data driving circuit is short circuited while within the pulses of the detection timing signal, and does not perform detection while outside of the pulses of the detection timing signal.

9. The scan-type display apparatus as claimed in claim 8, wherein a starting point of the scan time interval of an $n^{th}$ one of the scan driving circuits is concurrent with an end point of the scan time interval of an $(n-1)^{th}$ one of the scan driving circuits, where $2 \le n \le N$ and N is a total number of said scan driving circuits.

10. The scan-type display apparatus as claimed in claim 8, wherein, with respect to each of said scan driving circuits, when the detection signals cooperatively indicate that at least one of said LEDs connected to said scan line corresponding to said scan driving circuit is short circuited, the clamp signal corresponding to said scan driving circuit is at the voltage level corresponding to conduction of said clamp switch during a clamp time segment of the clamp time interval, and is at the voltage level corresponding to non-conduction of said clamp switch during other times of the operation cycle.

11. The scan-type display apparatus as claimed in claim 4, comprising a plurality of said LED arrays and a plurality of said data drivers, wherein:

said scan driver is connected to said LED arrays;

said data drivers are connected to said LED arrays;

a first one of said data drivers outputs the detection signals generated thereby;

an $s^{th}$ one of said data drivers is connected to an $(s-1)^{th}$ one of said data drivers to receive the detection signals outputted by the $(s-1)^{th}$ one of said data drivers, and outputs the detection signals received from the $(s-1)^{th}$ one of said data drivers and the detection signals generated by the $s^{th}$ one of said data drivers, where $2 \le s \le S-1$ and S is a total number of said data drivers; and an $S^{th}$ one of said data drivers is connected to an $(S-1)^{th}$ one of said data drivers and said scan controller, receives the detection signals outputted by the $(S-1)^{th}$ one of said data drivers, and outputs the detection signals received from the $(S-1)^{th}$ one of said data drivers and the detection signals generated by the $S^{th}$ one of said data drivers for receipt by said scan controller.

12. The scan-type display apparatus as claimed in claim 11, comprising a plurality of said scan drivers, wherein:

said scan drivers are connected to said LED arrays; and said scan controller of each of said scan drivers is connected to the $S^{th}$ one of said data drivers to receive the detection signals outputted by the $S^{th}$ one of said data drivers.

13. The scan-type display apparatus as claimed in claim 4, comprising a plurality of said LED arrays and a plurality of said data drivers, wherein:

said scan driver is connected to said LED arrays;

said data drivers are connected to said LED arrays; and each of said data drivers is connected to said scan controller, and outputs the detection signals generated by said data driver for receipt by said scan controller.

14. The scan-type display apparatus as claimed in claim 13, comprising a plurality of said scan drivers, wherein:

said scan drivers are connected to said LED arrays; and said scan controller of each of said scan drivers is connected to said data drivers to receive the detection signals outputted by said data drivers.

15. The scan-type display apparatus as claimed in claim 5, comprising a plurality of said LED arrays, a plurality of said scan drivers and a plurality of said data drivers, wherein:

said scan drivers are connected to said LED arrays;

said data drivers are connected to said LED arrays;

a first one of said data drivers outputs the detection signals generated thereby;

an $s^{th}$ one of said data drivers is connected to an $(s-1)^{th}$ one of said data drivers to receive the detection signals outputted by the $(s-1)^{th}$ one of said data drivers, and outputs the detection signals received from the $(s-1)^{th}$ one of said data drivers and the detection signals generated by the $s^{th}$ one of said data drivers, where $2 \leq s \leq S$ and S is a total number of said data drivers;

said scan controller of a first one of said scan drivers is connected to the $S^{th}$ one of said data drivers to receive the detection signals outputted by the $S^{th}$ one of said data drivers, and outputs the detection signals received from the $S^{th}$ one of said data drivers;

said scan controller of an $r^{th}$ one of said scan drivers is connected to said scan controller of an $(r-1)^{th}$ one of said scan drivers to receive the detection signals outputted by said scan controller of the $(r-1)^{th}$ one of said scan drivers, and outputs the detection signals received from said scan controller of the $(r-1)^{th}$ one of said scan drivers, where $2 \leq r \leq R-1$ and R is a total number of said scan drivers; and said scan controller of an $R^{th}$ one of said scan drivers is connected to said scan controller of an $(R-1)^{th}$ one of said scan drivers to receive the detection signals outputted by said scan controller of the $(R-1)^{th}$ one of said scan drivers.

16. The scan-type display apparatus as claimed in claim 4, comprising a plurality of said LED arrays, a plurality of said scan drivers and a plurality of said data drivers, wherein:

said scan drivers are connected to said LED arrays;

said data drivers are connected to said LED arrays;

each of said data drivers outputs the detection signals generated thereby;

said scan controller of a first one of said scan drivers is connected to said data drivers to receive the detection signals outputted by said data drivers, and outputs the detection signals received from said data drivers;

said scan controller of an $r^{th}$ one of said scan drivers is connected to said scan controller of an $(r-1)^{th}$ one of said scan drivers to receive the detection signals outputted by said scan controller of the $(r-1)^{th}$ one of said scan drivers, and outputs the detection signals received from said scan controller of the $(r-1)^{th}$ one of said scan drivers, where $2 \leq r \leq R-1$ and R is a total number of said scan drivers; and said scan controller of an $R^{th}$ one of said scan drivers is connected to said scan controller of an $(R-1)^{th}$ one of said scan drivers to receive the detection signals outputted by said scan controller of the $(R-1)^{th}$ one of said scan drivers.

17. The scan-type display apparatus as claimed in claim 4, comprising a plurality of said LED arrays and a plurality of said data drivers, and further comprising a controller device, wherein:

said scan driver is connected to said LED arrays;

said data drivers are connected to said LED arrays;

a first one of said data drivers outputs the detection signals generated thereby;

an $s^{th}$ one of said data drivers is connected to an $(s-1)^{th}$ one of said data drivers to receive the detection signals outputted by the $(s-1)^{th}$ one of said data drivers, and outputs the detection signals received from the $(s-1)^{th}$ one of said data drivers and the detection signals generated by the $s^{th}$ one of said data drivers, where $2 \leq s \leq S$ and S is a total number of said data drivers; and said controller device is connected to an $S^{th}$ one of said data drivers and said scan controller, receives the detection signals outputted by the $S^{th}$ one of said data drivers, and outputs the detection signals received from the $S^{th}$ one of said data drivers for receipt by said scan controller.

18. The scan-type display apparatus as claimed in claim 17, comprising a plurality of said scan drivers, wherein:

said scan drivers are connected to said LED arrays;

said scan controller of each of said scan drivers is connected to said controller device to receive the detection signals outputted by said controller device.

19. The scan-type display apparatus as claimed in claim 4, comprising a plurality of said LED arrays, a plurality of said scan drivers and a plurality of said data drivers, and further comprising a controller device, wherein:

said scan drivers are connected to said LED arrays;

said data drivers are connected to said LED arrays;

a first one of said data drivers outputs the detection signals generated thereby;

an $s^{th}$ one of said data drivers is connected to an $(s-1)^{th}$ one of said data drivers to receive the detection signals outputted by the $(s-1)^{th}$ one of said data drivers, and outputs the detection signals received from the $(s-1)^{th}$ one of said data drivers and the detection signals generated by the $s^{th}$ one of said data drivers, where $2 \leq s \leq S$ and S is a total number of said data drivers;

said controller device is connected to an $S^{th}$ one of said data drivers to receive the detection signals outputted by the $S^{th}$ one of said data drivers, and outputs the detection signals received from the $S^{th}$ one of said data drivers;

said scan controller of a first one of said scan drivers is connected to said controller device to receive the detection signals outputted by said controller device, and outputs the detection signals received from said controller device;

said scan controller of an $r^{th}$ one of said scan drivers is connected to said scan controller of an $(r-1)^{th}$ one of said scan drivers to receive the detection signals outputted by said scan controller of the $(r-1)^{th}$ one of said scan drivers, and outputs the detection signals received from said scan controller of the $(r-1)^{th}$ one of said scan drivers, where $2 \leq r \leq R-1$ and R is a total number of said scan drivers; and said scan controller of an $R^{th}$ one of said scan drivers is connected to said scan controller of an $(R-1)^{th}$ one of said scan drivers to receive the detection signals outputted by said scan controller of the $(R-1)^{th}$ one of said scan drivers.

20. A data driver adapted to be used in a scan-type display apparatus that includes a light emitting diode (LED) array, the LED array having a common anode configuration, and including a plurality of data lines and a plurality of LEDs, each of the LEDs being connected to a corresponding one of the data lines, said data driver comprising a plurality of data driving circuits that respectively correspond to the data lines, each of said data driving circuits including:

a current driver having an output terminal that is connected to the data line corresponding to said data driving circuit, receiving a pulse width control signal, and outputting one of a drive current and a clamp voltage at said output terminal of said current driver based on the pulse width control signal; and a detector connected to said current driver to receive a feed-in voltage related to a voltage at said output terminal of said current driver, further receiving a detection timing signal, and generating a detection signal that indicates whether any one of the LEDs connected to the data line corresponding to said data driving circuit is short circuited based on the feed-in voltage and the detection timing signal;

wherein, with respect to each of said data driving circuits, said detector is connected to said output terminal of said current driver, and receives the voltage at said output terminal of said current driver to serve as the feed-in-voltage, and said current driver includes a voltage regulator generating the clamp voltage, an inverter receiving the pulse width control signal, and generating an inverted control signal that is a logical complement of the pulse width control signal in logic value, a constant current generator generating the drive current, a first switch having a first terminal that is connected to said output terminal of said current driver, a second terminal that is connected to said constant current generator, and a control terminal that receives the pulse width control signal, said first switch, when conducting based on the pulse width control signal, permitting flow of the drive current therethrough, and a second switch having a first terminal that is connected to said voltage regulator, a second terminal that is connected to said output terminal of said current driver, and a control terminal that is connected to said inverter to receive the inverted control signal, said second switch, when conducting based on the inverted control signal, permitting transmission of the clamp voltage therethrough.

21. The data driver as claimed in claim 20, wherein, with respect to each of said data driving circuits, said detector includes:

a comparator having a first input terminal that is connected to said current driver to receive the feed-in voltage, a second input terminal that receives a predetermined reference voltage, and an output terminal that provides a comparison signal; and a logic gate having a first input terminal that is connected to said output terminal of said comparator to receive the comparison signal, a second input terminal that receives the detection timing signal, and an output terminal that provides the detection signal.

* * * * *